US012687795B2

(12) United States Patent
Shiotari et al.

(10) Patent No.: US 12,687,795 B2
(45) Date of Patent: Jul. 21, 2026

(54) TONER

(71) Applicant: CANON KABUSHIKI KAISHA, Tokyo (JP)

(72) Inventors: Yoshiaki Shiotari, Shizuoka (JP); Takashi Kenmoku, Shizuoka (JP); Shohei Kototani, Shizuoka (JP); Mayumi Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 421 days.

(21) Appl. No.: 18/350,248

(22) Filed: Jul. 11, 2023

(65) Prior Publication Data

US 2024/0019793 A1 Jan. 18, 2024

(30) Foreign Application Priority Data

Jul. 15, 2022 (JP) ................................ 2022-113833

(51) Int. Cl.

*G03G 9/093* (2006.01)
*G03G 9/08* (2006.01)
*G03G 9/087* (2006.01)
*G03G 9/097* (2006.01)

(52) U.S. Cl.

CPC ....... *G03G 9/09364* (2013.01); *G03G 9/0825* (2013.01); *G03G 9/08711* (2013.01); *G03G 9/08791* (2013.01); *G03G 9/09733* (2013.01)

(58) Field of Classification Search

CPC ............. G03G 9/09364; G03G 9/0825; G03G 9/08711; G03G 9/08791; G03G 9/09733
See application file for complete search history.

(56) References Cited

U.S. PATENT DOCUMENTS

| | | | |
|---|---|---|---|
| 7,393,912 | B2 | 7/2008 | Mihara |
| 7,399,568 | B2 | 7/2008 | Fuku |
| 7,452,960 | B2 | 11/2008 | Yano |
| 7,510,813 | B2 | 3/2009 | Yano |
| 7,638,194 | B2 | 12/2009 | Fukui |
| 7,638,590 | B2 | 12/2009 | Fukui |
| 7,682,765 | B2 | 3/2010 | Sugawa |
| 7,795,363 | B2 | 9/2010 | Fukui |
| 7,811,735 | B2 | 10/2010 | Nakamura et al. |
| 7,935,771 | B2 | 5/2011 | Fukui |
| 8,067,136 | B2 | 11/2011 | Yano |
| 8,110,329 | B2 | 2/2012 | Tominaga |
| 8,178,271 | B2 | 5/2012 | Fukui |
| 8,288,069 | B2 | 10/2012 | Fujikawa |
| 8,323,726 | B2 | 12/2012 | Naka |
| 8,367,289 | B2 | 2/2013 | Isono |
| 8,383,312 | B2 | 2/2013 | Fujimoto |
| 8,440,382 | B2 | 5/2013 | Isono |
| 8,497,054 | B2 | 7/2013 | Sugiyama |
| 8,574,801 | B2 | 11/2013 | Itabashi |
| 8,609,312 | B2 | 12/2013 | Itabashi |
| 8,652,737 | B2 | 2/2014 | Handa |
| 8,778,581 | B2 | 7/2014 | Nonaka |
| 8,828,633 | B2 | 9/2014 | Itabashi |
| 8,918,035 | B2 | 12/2014 | Hasegawa |
| 8,986,914 | B2 | 3/2015 | Fujikawa |
| 9,029,056 | B2 | 5/2015 | Kenmoku |
| 9,034,549 | B2 | 5/2015 | Shiotari |
| 9,098,002 | B2 | 8/2015 | Kenmoku |
| 9,098,003 | B2 | 8/2015 | Masumoto |
| 9,158,216 | B2 | 10/2015 | Shimano |
| 9,244,371 | B2 | 1/2016 | Suzumura |
| 9,256,148 | B2 | 2/2016 | Fujikawa |
| 9,261,806 | B2 | 2/2016 | Moribe |
| 9,285,697 | B2 | 3/2016 | Fukudome |
| 9,304,422 | B2 | 4/2016 | Matsui |
| 9,348,246 | B2 | 5/2016 | Magome |
| 9,354,545 | B2 | 5/2016 | Matsui |

(Continued)

FOREIGN PATENT DOCUMENTS

| | | |
|---|---|---|
| JP | 9-114134 A | 5/1997 |
| JP | 9-179341 A | 7/1997 |

(Continued)

OTHER PUBLICATIONS

Robert F. Fedors, A Method for Estimating Both the Solubility Parameters and Molar Volumes of Liquids, Polymer Engineering and Science, vol. 14, No. 2, 147-154,1974.
U.S. Appl. No. 18/321,312, filed May 22, 2023, Keisuke Adachi.
U.S. Appl. No. 18/327,506, filed Jun. 1, 2023, Masaya Komuro.
U.S. Appl. No. 18/350,260, filed Jul. 11, 2023, Kenji Ookubo.
U.S. Appl. No. 18/350,266, filed Jul. 11, 2023, Mayumi Inoue.
U.S. Appl. No. 18/350,309, filed Jul. 11, 2023, Naoya Isono.
U.S. Appl. No. 18/350,331, filed Jul. 11, 2023, Shohei Kototani.
U.S. Appl. No. 18/354,776, filed Jul. 19, 2023, Shohei Kototani.

*Primary Examiner* — Mark F. Huff
*Assistant Examiner* — Boone Alexander Evans
(74) *Attorney, Agent, or Firm* — VENABLE LLP

(57) ABSTRACT

A toner comprising a toner particle, wherein the toner particle comprises a toner core particle, and the toner core particle comprises a binder resin; the binder resin comprises a resin A; the resin A comprises a monomer unit M1 having a specific structure in a specific amount, and a monomer unit M2 comprising an organosilicon polymer segment in a specific amount; the organosilicon polymer segment has a T3 unit structure and a T2 unit structure; in a DD/MAS measurement of the resin A by solid-state $^{29}$Si-NMR, a proportion of a peak area corresponding to a silicon atom with the T3 unit structure, and a proportion of a peak area corresponding to a silicon atom with the T2 unit structure satisfy a specific relationship; and the weight-average molecular weight Mw of a tetrahydrofuran-soluble fraction of the resin A lies within a specific range.

10 Claims, No Drawings

(56) References Cited

U.S. PATENT DOCUMENTS

| | | | |
|---|---|---|---|
| 9,377,705 | B2 | 6/2016 | Shimano |
| 9,377,708 | B2 | 6/2016 | Magome |
| 9,383,668 | B2 | 7/2016 | Noji |
| 9,423,711 | B2 | 8/2016 | Uratani |
| 9,423,714 | B2 | 8/2016 | Kenmoku |
| 9,442,416 | B2 | 9/2016 | Magome |
| 9,500,972 | B2 | 11/2016 | Tanaka |
| 9,575,424 | B2 | 2/2017 | Nakagawa |
| 9,594,323 | B2 | 3/2017 | Fujikawa |
| 9,599,919 | B2 | 3/2017 | Isono |
| 9,625,842 | B2 | 4/2017 | Uratani |
| 9,658,546 | B2 | 5/2017 | Tanaka |
| 9,658,549 | B2 | 5/2017 | Tanaka |
| 9,785,071 | B2 | 10/2017 | Shimano |
| 9,804,514 | B2 | 10/2017 | Suzumura |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,880,478 | B2 | 1/2018 | Shimano |
| 9,904,193 | B2 | 2/2018 | Nakagawa |
| 9,958,801 | B2 | 5/2018 | Tanaka |
| 9,964,874 | B2 | 5/2018 | Suzumura |
| 10,054,866 | B2 | 8/2018 | Tanaka |
| 10,078,279 | B2 | 9/2018 | Nakagawa |
| 10,101,681 | B2 | 10/2018 | Tagawa |
| 10,114,303 | B2 | 10/2018 | Katsura |
| 10,216,107 | B2 | 2/2019 | Tsubaki |
| 10,228,627 | B2 | 3/2019 | Nagashima |
| 10,310,397 | B2 | 6/2019 | Sano |
| 10,545,420 | B2 | 1/2020 | Kinumatsu |
| 10,578,990 | B2 | 3/2020 | Tsuda |
| 10,678,155 | B2 | 6/2020 | Terui |
| 10,698,327 | B2 | 6/2020 | Nagashima |
| 10,747,133 | B2 | 8/2020 | Yagi |
| 10,747,136 | B2 | 8/2020 | Kenmoku |
| 10,782,623 | B2 | 9/2020 | Yoshiba |
| 10,942,465 | B2 | 3/2021 | Kototani |
| 10,942,466 | B2 | 3/2021 | Tominaga |
| 10,948,839 | B2 | 3/2021 | Tsubaki |
| 10,976,678 | B2 | 4/2021 | Yamawaki |
| 10,976,679 | B2 | 4/2021 | Tanaka |
| 11,003,104 | B2 | 5/2021 | Katsura |
| 11,003,105 | B2 | 5/2021 | Sato |
| 11,086,242 | B2 | 8/2021 | Isono |
| 11,112,708 | B2 | 9/2021 | Uratani |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,845 | B2 | 11/2021 | Shimoda |
| 11,249,412 | B2 | 2/2022 | Kawamura |
| 11,256,187 | B2 | 2/2022 | Ogaki |
| 11,314,178 | B2 | 4/2022 | Kenmoku |
| 11,347,157 | B2 | 5/2022 | Kamikura |
| 11,397,386 | B2 | 7/2022 | Kyuushima |
| 11,531,282 | B2 | 12/2022 | Kamikura |
| 11,714,363 | B2 | 8/2023 | Ookubo |
| 2012/0328979 | A1 | 12/2012 | Yoshizaki |
| 2013/0011774 | A1 | 1/2013 | Kamiwaki et al. |
| 2015/0099222 | A1* | 4/2015 | Terui .................... G03G 9/0825 430/109.3 |
| 2020/0026208 | A1 | 1/2020 | Terui |
| 2020/0124998 | A1 | 4/2020 | Kototani |
| 2020/0209771 | A1 | 7/2020 | Hashimoto et al. |
| 2020/0292955 | A1 | 9/2020 | Matsunaga et al. |
| 2020/0341400 | A1* | 10/2020 | Shimoda ............ G03G 9/08782 |
| 2021/0026265 | A1 | 1/2021 | Kamikura et al. |
| 2021/0223731 | A1 | 7/2021 | Suzuki et al. |
| 2021/0311405 | A1 | 10/2021 | Shiotari |
| 2021/0318630 | A1 | 10/2021 | Terui |
| 2021/0318631 | A1 | 10/2021 | Isono |
| 2022/0075284 | A1 | 3/2022 | Nakayama |
| 2022/0128915 | A1 | 4/2022 | Toyoda |
| 2022/0128916 | A1 | 4/2022 | Yoshida |
| 2022/0128918 | A1 | 4/2022 | Kototani |
| 2022/0128919 | A1 | 4/2022 | Kawamura |
| 2022/0146952 | A1 | 5/2022 | Komiya |
| 2022/0146953 | A1 | 5/2022 | Kyuushima |
| 2022/0146954 | A1 | 5/2022 | Kato |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2022/0413407 | A1 | 12/2022 | Inoue |
| 2023/0080900 | A1 | 3/2023 | Kamikura |
| 2023/0114583 | A1 | 4/2023 | Kenmoku |
| 2023/0116451 | A1 | 4/2023 | Uratani |
| 2023/0117448 | A1 | 4/2023 | Fukudome |
| 2023/0119795 | A1 | 4/2023 | Saeki |
| 2023/0161277 | A1 | 5/2023 | Komiya |

FOREIGN PATENT DOCUMENTS

| | | | |
|---|---|---|---|
| JP | 2008-9211 | A | 1/2008 |
| JP | 2011-227498 | A | 11/2011 |
| JP | 2015-96948 | A | 5/2015 |
| JP | 2019-86641 | A | 6/2019 |
| JP | 2020-12943 | A | 1/2020 |
| JP | 2020-64254 | A | 4/2020 |
| JP | 2020-154292 | A | 9/2020 |
| JP | 2020-181187 | A | 11/2020 |
| JP | 2021-18335 | A | 2/2021 |
| JP | 2021-113861 | A | 8/2021 |
| JP | 2021-167896 | A | 10/2021 |
| JP | 2022-25866 | A | 2/2022 |
| JP | 2022-69321 | A | 5/2022 |
| JP | 2022-92582 | A | 6/2022 |

* cited by examiner

TONER

BACKGROUND OF THE INVENTION

Field of the Invention

The present disclosure relates to a toner used in recording methods using an electrophotographic scheme, electrostatic recording, or toner jet recording.

Description of the Related Art

Recent years have witnessed a growing demand, in the printer market, for smaller sizes of printer bodies, better image quality in prints, and greater number of prints that can be printed per toner cartridge.

In order to satisfy a number of printable pages while reducing equipment size it is necessary to reduce the spaces of the printer and of toner cartridges, and to reduce the number of parts. To shrink the space of a toner cartridge, moreover, it is necessary to fill a large amount of toner into a space that is smaller than conventional spaces.

When a large amount of toner is filled into a smaller space than conventional ones, however, the toner is acted upon by a stronger load than in conventional cases, as the toner is stirred. In such a situation, for instance an external additive fixed to the toner surface may become embedded therein as the number of outputted prints increases, and the toner itself may break or deform in harsh situations. In consequence, the toner needs to exhibit higher stress resistance than is conventionally the case.

Reducing the number of parts can also be achieved by increasing the charging stability of the toner, thereby achieving a more compact or reduced number of charging member.

Against this background, toners are thus required to exhibit better stress resistance and charging stability than conventional toners; one means being addressed in terms of attaining this goal involves using a resin that comprises an organosilicon polymer.

For instance, Japanese Patent Application Publication No. H9-179341 proposes a toner that withstands stress in terms of in-equipment stirring or the like, while boasting excellent low-temperature fixability, through formation of a thin layer of an organosilicon polymer shell on the toner surface. Japanese Patent Application Publication No. 2015-096948 proposes a method that involves providing an organosilicon polymer layer on the toner surface, by incorporating a vinyl resin having an organosilicon polymer segment on a surface layer of a toner particle, to suppress thus toner degradation derived for instance from stirring, and suppress bleeding of a material from the interior of the toner particle. In Japanese Patent Application Publication No. 2020-181187, release of an organosilicon polymer from the toner particle surface is suppressed, and alteration of the toner derived from durability is suppressed, through the use of a resin having an organosilicon polymer segment.

SUMMARY OF THE INVENTION

In a case by contrast where an organosilicon polymer is used, the fixation temperature of the toner rises due to the fact that the organosilicon polymer has lower thermoplasticity than that of general toner resins. Moreover, the viscosity of the toner does not drop readily at the time of fixing.

In all the methods described in Japanese Patent Application Publication No. H9-179341, Japanese Patent Application Publication No. 2015-096948 and Japanese Patent Application Publication No. 2020-181187, the resistance of the toner towards stress increases, but the viscosity of the toner when melted also increases. As a result, the gloss of the fixed image decreases, and it becomes difficult to obtain high-quality prints. In some cases, adhesiveness between paper and toner and releasability between the toner and a fixing unit may be hindered, which has an impact on fixing performance. As pointed out above, it is difficult to achieve both toner durability and image glossiness in accordance with conventional methods.

The present disclosure provides a toner that is excellent in low-temperature fixability, hot offset resistance and image glossiness, and that capable for maintaining charge rise-up and transferability also over long periods of time.

A toner comprising a toner particle, wherein the toner particle comprises a toner core particle;

the toner core particle comprises a binder resin;

the binder resin comprises a resin A;

the resin A is a styrene-acrylic copolymer;

the resin A comprises a monomer unit M1 represented by formula (1) in a content of 65 to 85 mass %;

the resin A comprises a monomer unit M2 represented by formula (2) from 0.05 to 2.00 mass % of, and the monomer unit M2 comprises an organosilicon polymer segment;

the organosilicon polymer segment has a T3 unit structure and a T2 unit structure;

in a DD/MAS measurement of the resin A by solid-state $^{29}$Si-NMR, when a ratio of a peak area corresponding to a silicon atom with the T3 unit structure relative to a total of peak areas corresponding to silicon atoms in the organosilicon polymer segment is denoted by A (%), and a ratio of a peak area corresponding to a silicon atom with the T2 unit structure relative to the total of peak areas corresponding to silicon atoms in the organosilicon polymer segment is denoted by B (%), the A and B satisfy formulae (3) and (4);

$$0.3 \leq A/B \leq 2.7, \tag{3}$$

$$62 \leq A+B \leq 100, \tag{4}$$

a weight-average molecular weight Mw of a tetrahydrofuran-soluble fraction of the resin A measured by gel permeation chromatography is 50000 to 250000, (1)

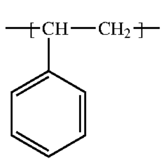

(2)

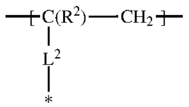

where, in formula (2), $L^2$ represents a single bond, $-COO-(CH_2)_n-$ or $-NH-(CH_2)_n-$ (n is an integer from 1 to 10), $R^2$ represents a hydrogen atom or a methyl group, and * represents a site of bonding to a silicon atom of the organosilicon polymer segment. In a case where $L^2$ is $-COO-(CH_2)_n-$, a carbonyl is bonded to a carbon bonding $R^2$, while in a case where $L^2$ is —NH—$(CH_2)_n$—, NH is bonded to a carbon bonding $R^2$.

According to the present disclosure, it is possible to provide a toner that is excellent in low-temperature fixability, hot offset resistance, and image glossiness, and that capable for maintain charge rise-up and a transferability even after long-term use.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

The "monomer unit" refers to the reacted form of a monomer substance in a polymer. For example, one carbon-carbon bond section in the main chain in the polymer in which the polymerizable monomer has been polymerized is defined as one unit. The polymerizable monomer can be represented by the following formula (C).

(C)

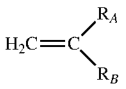

In the formula (C), $R_A$ represents a hydrogen atom or an alkyl group (preferably an alkyl group having from 1 to 3 carbon atoms, and more preferably a methyl group), and $R_B$ represents an arbitrary substituent.

Organosilicon polymers are more brittle than styrene-acrylic resins and polyester resins that are used in toner applications, and exhibit excellent in stress resistance. On the other hand, organosilicon polymers have a high heat resistance characteristic, and are less thermoplastic than styrene-acrylic resins and polyester resins, and accordingly organosilicon polymers are difficult to become fixed on their own. Resin hybridization is herein an example of a method that can be resorted to while balancing the each characteristics of the materials.

However, in a case by contrast where organosilicon polymer segments are introduced into styrene-acrylic resins or polyester resins, the durability of the toner improves as compared with a case where a styrene-acrylic resin or a polyester resin is used alone, although at the expense of worsened low-temperature fixability and image glossiness.

For instance, high molecular weight in a resin is an underlying reason for impaired low-temperature fixability and image glossiness. It has however been found that resins into which organosilicon polymer segments have been introduced exhibit inferior low-temperature fixability as compared with resins into which organosilicon polymer segments have not been introduced, even when the molecular weights of the resins are roughly the same.

The inventors speculated that the large amount of polar groups in an organosilicon polymer may give rise to cross-linking on account of non-covalent bonds derived from polar groups, when the organosilicon polymer is introduced into the resin, and conducted diligent research on this issue. The inventors found as a result that the above problem can be solved by the following configuration.

The present disclosure related to a toner comprising a toner particle, wherein the toner particle comprises a toner core particle,
the toner core particle comprises a binder resin;
the binder resin comprises a resin A;
the resin A is a styrene-acrylic copolymer;
the resin A comprises a monomer unit M1 represented by formula (1) in a content of 65 to 85 mass % of,
the resin A comprises a monomer unit M2 represented by formula (2) in a content of 0.05 to 2.00 mass %,
the monomer unit M2 comprises an organosilicon polymer segment;
the organosilicon polymer segment has a T3 unit structure and a T2 unit structure;
in a DD/MAS measurement of the resin A by solid-state $^{29}$Si-NMR,
when a ratio of a peak area corresponding to a silicon atom with the T3 unit structure relative to a total of peak areas corresponding to silicon atoms in the organosilicon polymer segment is denoted by A (%), and a ratio of a peak area corresponding to a silicon atom with the T2 unit structure relative to the total of peak areas corresponding to silicon atoms in the organosilicon polymer segment is denoted by B (0%),
the A and B satisfy formulae (3) and (4);

$$0.3 \le A/B \le 2.7, \quad (3)$$

$$62 \le A+B \le 100, \quad (4)$$

a weight-average molecular weight Mw of a tetrahydrofuran-soluble fraction of the resin A measured by gel permeation chromatography is 50000 to 250000, (1)

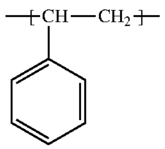

(2)

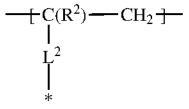

where, in formula (2), $L^2$ represents a single bond, —COO—$(CH_2)_n$— or —NH—$(CH_2)_n$— (n is an integer from 1 to 10), $R^2$ represents a hydrogen atom or a methyl group, and * represents a site of bonding to a silicon atom of the organosilicon polymer segment. In a case where $L^2$ is —COO—$(CH_2)_n$—, a carbonyl is bonded to a carbon bonding $R^2$, while in a case where $L^2$ is —NH—$(CH_2)_n$—, NH is bonded to a carbon bonding $R^2$.

The toner comprises a toner particle, and the toner particle comprises a toner core particle that in turn comprises a binder resin. The binder resin comprises a resin A.

The resin A is a styrene-acrylic copolymer, and comprises a monomer unit M1 represented by formula (1) below, and a monomer unit M2 represented by formula (2) below and comprising an organosilicon polymer segment. That is, the resin A is a styrene-acrylic resin comprising an organosilicon polymer segment.

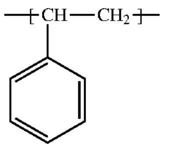

(1)

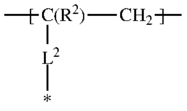

(2)

In formula (2), $L^2$ represents a single bond, $—COO—(CH_2)_n—$ or $—NH—(CH_2)_n—$ (n is an integer from 1 to 10), $R^2$ represents a hydrogen atom or a methyl group, and * represents a site of bonding to a silicon atom of the organosilicon polymer segment. In a case where $L^2$ is $—COO—(CH_2)_n—$, a carbonyl is bonded to a carbon bonding $R^2$, while in a case where $L^2$ is $—NH—(CH_2)_n—$, NH is bonded to a carbon bonding $R^2$.

Upon melting of the toner at the time of fixing, hydrogen bonds form between ester groups, hydroxyl groups and/or carboxyl groups comprised in the resin. As a result, the viscosity of toner when melted increases, and the melted toner cannot be smoothly fixed onto paper, which translates into lower image glossiness.

Studies by the inventors have revealed that by setting the content and structure of the monomer unit M1 and the monomer unit M2 in the resin A to lie within specific ranges it becomes possible to provide a toner that exhibits high image glossiness and that is excellent in low-temperature fixability, at levels that could not be attained conventionally, and while maximizing the benefits of the durability of a resin that comprises an organosilicon polymer segment.

The resin A comprises the monomer unit M1 represented by formula (1) in a content of 65 to 85 mass %.

Most of the styrene-acrylic resins used in toner applications are made up of styrene monomers and vinyl monomers having an ester group. In a case where the content of the monomer unit M1 in the resin A is lower than 65 mass %, the amount of the ester group-comprising vinyl monomer relatively increases, and as a result the amount of proton acceptors in the binder resin increases as well. The hydroxyl groups of the monomer unit M2 in the resin A, which will be explained in detail further on, are proton donors. In a case where therefore where the content of the monomer unit M1 in the resin A is lower than 65 mass %, hydrogen bonds is readily formed in the binder resin, and image glossiness decreased.

In a case by contrast where the content of the monomer unit M1 in the resin A is 85 mass % or higher, the glass transition temperature of the resin A rises, and the resin A itself becomes harder, which results in inferior low-temperature fixability and inferior image glossiness.

The content of the monomer unit M1 in the resin A is preferably 70 mass % or higher, more preferably 73 mass % or higher. The content is preferably 83 mass % or lower, more preferably 80 mass % or lower. For instance, the content ranges preferably from 70 to 83 mass %, or from 73 to 80 mass %.

The resin A comprises the monomer unit M2 represented by formula (2) in a content of 0.05 to 2.00 mass %. The monomer unit M2 comprises an organosilicon polymer segment.

As described above, the organosilicon polymer segment comprised in the monomer unit M2 has hydroxyl groups that are a proton donor as and accordingly forms hydrogen bonds with ester groups in the resin A or ester groups in other resin components. In a case where the content of the monomer unit M2 in the resin A is lower than 0.05 mass %, therefore, the amount of proton donors decreases, and hydrogen bonds are unlikely to form in the binder resin. The viscosity of the toner, when melted on account of the heat of the fixing unit, decreases as a result, and hot offset occurs and the surface of the fixed image becomes rougher, which translates into decreased image glossiness.

In a case by contrast where the content of the monomer unit M2 in the resin A exceeds 2.00 mass %, the amount of proton donors increases, and hydrogen bonds from readily within the binder resin, so that viscosity at the time of toner melting rises as a result. In consequence, numerous irregularities occur in the fixed image, and image glossiness decreases.

The content of the monomer unit M2 in the resin A is preferably 0.10 mass % or higher, more preferably 0.50 mass % or higher, and yet more preferably 1.00 mass % or higher. The content is preferably 1.80 mass % or lower, and more preferably 1.50 mass % or lower. For instance, the content ranges preferably from 0.10 to 1.80 mass %, or from 0.50 to 1.80 mass %, or from 1.00 to 1.80 mass %, or from 0.50 to 1.50 mass %, or from 1.00 to 1.50 mass %.

The organosilicon polymer segment comprised in the monomer unit M2 in the resin A has a T3 unit structure and a T2 unit structure. With a ratio of a peak area corresponding to a silicon atom with the T3 unit structure is denoted by A (%), and a ratio of the peak area corresponding to a silicon atom with the T2 unit structure is denoted by B (%), relative to the total of peak areas corresponding to silicon atoms in the organosilicon polymer segment, in DD/MAS measurement of the resin A by solid-state $^{29}$Si-NMR, the above A and B satisfy formulae (3) and (4) below.

$$0.3 \leq A/B \leq 2.7, \quad (3)$$

$$62 \leq A+B \leq 100, \quad (4)$$

Polymers of organosilicon compounds have a skeleton structure made up of four types of basic units, namely an M unit, a D unit, a T unit and a Q unit, since silicon has four bonds. The M unit, the D unit, the T unit and the Q units are each a structure resulting from bonding of a monofunctional, a bifunctional, a trifunctional and a tetrafunctional organosilicon compound, respectively.

When the organosilicon polymer segment has a T unit, proton donation by hydroxyl groups of the organosilicon polymer segment can be controlled to lie within a specific range, and the viscosity of the toner when melted can be controlled to lie within an appropriate range.

In addition, the T unit is classified into structures that include a T1 unit structure having two reactive groups such as hydroxyl groups, a T2 unit structure having one reactive group such as a hydroxyl group, and a T3 unit structure having no reactive group such as a hydroxyl group. Image glossiness and low-temperature fixability are excellent, and image fogging can be suppressed, when the organosilicon polymer segment has the T3 unit structure and the T2 unit structure, and the ratio A (%) of silicon atoms with the T3 unit structure and the ratio B (%) of silicon atoms with the T2 unit structure satisfy formulae (3) and (4).

The fact that the above A and B satisfy formulae (3) and (4) signifies that there are numerous T2 and T3 unit structures, and few T1 unit structures, in the organosilicon polymer segment.

The T1 unit structure readily exhibits reaction activity, such that the organosilicon polymer chains undergo coupling reactions that result in increased viscosity on account of heat or the like at the time of fixing; in consequence, image glossiness decreases when there are numerous T1 unit structures present in the organosilicon polymer segments.

By contrast, the T2 unit structure exhibits low reaction activity and is not prone to give rise to increased viscosity even upon heating at the time of fixing; however, the hydroxyl group in the T2 unit structure form hydrogen bonds with water molecules in the atmosphere, and thus conductive sites derived from water molecules are prone to form as a result. In consequence, the charge quantity of the toner decreases, which results in image fogging, when numerous T2 unit structures are present in the organosilicon polymer segment.

In a case where the value of A/B satisfies formula (3), the toner exhibits good charge rise-up and excellent durability.

Further, a value of A/B lower than 0.3 indicates that there are numerous T2 unit structures in the organosilicon polymer segment. As described above, the number of conductive sites derived from water molecules increases as a result, which translates into a decreased toner charge quantity and into image fogging.

A value of A/B in excess of 2.7, meanwhile, signifies that there are few T2 unit structures in the organosilicon polymer segment. As a result, a charge rise-up effect fails to be achieved, and image fogging derived from charge-up is prone to occur.

The value of A/B is preferably 0.5 or higher, more preferably 1.0 or higher and yet more preferably 1.5 or higher. The value of A/B is preferably 2.5 or lower, more preferably 2.3 or lower and yet more preferably 2.0 or lower. For instance, the value of A/B ranges preferably from 0.5 to 2.5, or from 1.0 to 2.3, or from 1.5 to 2.0.

In a case where the value of A+B satisfies formula (4), the T3 unit structure and the T2 unit structure are sufficiently present in the organosilicon polymer segment, and as a result the toner is less prone to become viscous, and image glossiness improves.

The value of A+B is preferably 65 or larger, more preferably 70 or larger, and yet more preferably 75 or larger. The value of A+B is preferably 95 or smaller, more preferably 90 or smaller, and yet more preferably 85 or smaller. For instance, the value of A+B ranges preferably from 65 to 95, or from 70 to 90, or from 75 to 85.

The value of A/B can be controlled on the basis of the type of silane coupling agent used to form the organosilicon polymer segment, and on the basis of production conditions such as temperature and pH at the time of a condensation reaction. Specifically, A/B can be increased by using a basic catalyst. Conversely, A/B can be reduced by using an acid catalyst.

Moreover, A+B can be controlled by adjusting the addition amount of silanol that is added to form the organosilicon polymer segment, and on the basis of the addition method and the reaction temperature. Specifically, A+B can be made larger by increasing the addition amount of silanol or by optimizing the addition method. Also, A+B can be reduced by reducing the addition amount of silanol.

The weight-average molecular weight Mw of the tetrahydrofuran (THF)-soluble fraction of the resin A worked out by gel permeation chromatography is 50000 to 250000.

In a case where the molecular weight of the resin A exceeds 250000, viscosity is high, regardless of the presence or absence of non-covalent bonds, and low-temperature fixability and image glossiness worsen as a result. In a case on the other hand where the weight-average molecular weight Mw of the resin A is lower than 50000, the hardness of the resin A itself is low, and an external additive tends to become embedded upon prolonged use of the toner. As a result, the charge quantity of the toner decreases, and image fogging is prone to occur.

The weight-average molecular weight Mw of a tetrahydrofuran-soluble fraction of the resin A is preferably 60000 or higher, more preferably 70000 or higher, and yet more preferably 80000 or higher. The molecular weight is preferably 240000 or lower, more preferably 230000 or lower, and yet more preferably 220000 or lower. For instance, the molecular weight ranges from 60000 to 240000, or from 70000 to 230000, or from 80000 to 220000.

The resin A preferably does not comprise a THF-insoluble fraction. In a case where the resin A contains a THF-insoluble fraction, the organosilicon polymer segment derived from the monomer unit M2 is insoluble in THF, and in addition, the distance between hydroxyl groups in the resin A is large, as a result of which a three-dimensional network of hydrogen bonds is formed, starting from the resin A. Such a network structure entails a higher viscosity of the toner when melted, and lower image glossiness at the time of fixing.

A detailed description follows now on the basis of a more preferable scope of the present disclosure.

Resins Constituting a Toner Core Particle

The resin A is a styrene-acrylic resin, and may comprise a polymer made up of a monofunctional polymerizable monomer or a polyfunctional polymerizable monomer, as a constituent material other than the monomer unit M1 and the monomer unit M2.

Examples of monofunctional polymerizable monomers include the following.

Monofunctional polymerizable monomers used in general toner applications, for instance styrene derivatives such as α-methyl styrene and β-methyl styrene; alkyl acrylic polymerizable monomers such as methyl acrylate, ethyl acrylate, butyl acrylate, n-propyl acrylate, 2-ethylhexyl acrylate, n-octyl acrylate, lauryl acrylate, stearyl acrylate and behenyl acrylate; methacrylic polymerizable monomers such as methyl methacrylate, n-propyl methacrylate, 2-ethylhexyl methacrylate, n-octyl methacrylate and n-nonyl methacrylate; methylene aliphatic monocarboxylic acid esters; vinyl esters such as vinyl acetate, vinyl propionate, vinyl butyrate, vinyl benzoate and vinyl formate; vinyl ethers such as vinyl methyl ether, vinyl ethyl ether and vinyl isobutyl ether; and vinyl ketones such as vinyl methyl ketone, vinyl hexyl ketone and vinyl isopropyl ketone.

Examples of polyfunctional polymerizable monomers include the following.

Polyfunctional polymerizable monomers used in general toner applications, for instance diethylene glycol diacrylate, triethylene glycol diacrylate, tetraethylene glycol diacrylate, 1,6-hexanediol diacrylate and neopentylglycol diacrylate.

The materials constituting the monomer unit M2 include polymerizable monomers having an organosilicon polymer segment and a vinylic polymerization site, and a combination of the above polymerizable monomer and various bifunctional and trifunctional organosilicon compounds.

Examples of polymerizable monomers having an organosilicon polymer segment and a vinylic polymerization site include the following.

Trifunctional vinylsilanes such as vinyltrimethoxysilane, vinyltriethoxysilane, vinyldiethoxymethoxysilane, vinylethoxydimethoxysilane, vinyltriisocyanate silane, vinyltrichlorosilane, vinylmethoxydichlorosilane, vinylethoxydichlorosilane, vinyldimethoxychlorosilane, vinylmethoxyethoxychlorosilane, vinyldiethoxychlorosilane, vinyltriacetoxysilane, vinyldiacetoxymethoxysilane, vinyldiacetoxyethoxysilane, vinylacetoxydimethoxysilane, vinylacetoxymethoxyethoxysilane, vinylacetoxy diethoxysilane, vinyltrihydroxysilane, vinylmethoxydihydroxysilane, vinylethoxydihydroxysilane, vinyldimethoxyhydroxysilane, vinylethoxymethoxyhydroxysilane and vinyldiethoxyhydroxysilane.

Trifunctional allylsilanes such as allyltrimethoxysilane, allyltriethoxysilane, allyltrichlorosilane, allyltriacetoxysilane and allyltrihydroxysilane.

Trifunctional methacryloalkylsilanes such as 3-methacryloxypropyltrimethoxysilane and 3-methacryloxypropyltriethoxysilane.

Trifunctional acryloxyalkylsilanes such as 3-acryloxypropyltrimethoxysilane and 3-acryloxypropyltriethoxysilane.

The organosilicon polymer segment resulting from bonding of a monomer unit M2 is preferably a polymer of an organosilicon compound having a structure represented by Formula (5) below.

$$R—Si—R^a_3 \qquad (5)$$

In formula (5), $R^a$ each independently represents a halogen atom or a alkoxy group with 1 to 3 carbon atoms, and R represents a alkyl group with 1 to 6 carbon atoms.

In a case where the organosilicon polymer segment is a siloxane-polymerizable vinylic polymer, examples include combinations with for instance the following organosilicon compounds, including the compounds of formula (5) above.

Trifunctional methylsilanes such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane and methyldiethoxyhydroxysilane.

Trifunctional silanes such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane and hexyltrihydroxysilane.

Trifunctional phenylsilanes such as phenyltrimethoxysilane, phenyltriethoxysilane, phenyltrichlorosilane, phenyltriacetoxysilane and phenyltrihydroxysilane.

The above organosilicon polymer segment may have an amino group. Specifically, the resin A may be a resin obtained through amidation of carboxy groups in a polyester resin and the amino group in an aminosilane.

Examples of aminosilanes include, although not particularly limited to, for instance γ-aminopropyltriethoxysilane, γ-aminopropyltrimethoxysilane, N-β(aminoethyl)γ-aminopropyltrimethoxysilane, N-β(aminoethyl)γ-aminopropylmethyldimethoxysilane, N-phenyly-aminopropyltriethoxysilane, N-phenyly-aminopropyltrimethoxysilane, N-β(aminoethyl)γ-aminopropyltriethoxysilane, N-6-(aminohexyl)3-aminopropyltrimethoxysilane, 3-aminopropyltrimethylsilane and 3-aminopropyl silicon.

The resin A preferably comprises a monomer unit M3 represented by formula (8) below in a content of 3 to 10 mass %. A sharp melt property in a fixation temperature region of the binder resin can be achieved when the content of the monomer unit M3 in the resin A lies within the above range. As a result, low-temperature fixability and image glossiness are further improved, and the occurrence of hot offset can be suppressed.

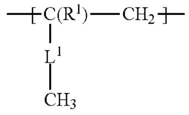

(8)

In formula (8), $L^1$ represents $—COO—(CH_2)_n—$ (n is an integer from 11 to 31), such that a carbonyl of $L^1$ is bonded to a carbon atom of a main chain; and $R^1$ represents a hydrogen atom or a methyl group.

The content of the monomer unit M3 in the resin A is more preferably from 4 to 9 mass %, and yet more preferably from 5 to 8 mass %.

More preferably, the monofunctional polymerizable monomer corresponding to the monomer unit M3 is lauryl acrylate or behenyl acrylate.

The toner comprises the resin A in a content of 50 mass % or higher preferably. Low-temperature fixability and image glossiness can be improved when the content of the resin A is 50 mass % or higher.

The content of resin A is more preferably 55 mass % or higher, and yet more preferably 60 mass % or higher. The upper limit is not particularly restricted, but may be 90 mass % or lower, and preferably 85 mass % or lower.

The binder resin may comprises a known resin other than the resin A. Examples of known resins include, although not particularly limited to, styrene-acrylic resins, epoxy resins, polyester resins, polyurethane resins, polyamide resins, cellulose resins, polyether resins, as well as mixed resins and composite resins of the foregoing. Styrene-acrylic resins and polyester resins are preferred herein, since these are inexpensive, readily available, and excellent in low-temperature fixability. More preferably, the binder resin contains a styrene-acrylic resin, in terms of bringing out excellent development durability.

Examples of constituent materials of the styrene-acrylic resin used as a binder resin include polymers made up of a monofunctional polymerizable monomers or polyfunctional polymerizable monomers, illustrated as examples of constituent materials other than the monomer unit M1 and monomer unit M2 of the resin A, and copolymers obtained by combining two or more types of the foregoing.

A toner core particle preferably comprises a resin B, besides the above binder resin and resin A. The weight-average molecular weight Mw of a tetrahydrofuran-soluble fraction of the resin B, determined by gel permeation chromatography, is preferably from 2000 to 7000, from the viewpoint of improving low-temperature fixability. The weight-average molecular weight Mw of a tetrahydrofuran-insoluble fraction of the resin B is more preferably from 2500 to 6500, and yet more preferably from 3000 to 6000.

In a case where the weight-average molecular weight Mw of the tetrahydrofuran-soluble fraction of the resin B lies within the above ranges, the resin B has a lower viscosity than the binder resin, and accordingly the resin B acts as an adhesive towards paper, thereby improving low-temperature fixability.

The resin B is preferably a styrene-acrylic resin that comprises the monomer unit M1. The content of the monomer unit M1 in the resin B is preferably from 85 to 100 mass %, and preferably from 95 to 100 mass %. When the content of the monomer unit M1 in the resin B lies within the above ranges, hydrogen bonds do not form readily between the resin B and other resins such as the resin A, and thus low-temperature fixability can be improved.

The monomer unit M1 comprised in the resin B is preferably present singly, although the resin B may be a copolymer of the monomer unit M1 and one or more other types of monomer units, in terms of adjusting the glass transition temperature of the resin B. The polymerizable monomers used for copolymerization can be appropriately selected herein depending on the toner particle to be produced, and for instance there can be used a vinylic polymerizable monomer that is amenable to radical polymerization. A monofunctional polymerizable monomer or a polyfunctional polymerizable monomer can be used as the vinylic polymerizable monomer.

As the monofunctional polymerizable monomer and the polyfunctional polymerizable monomer there can be used the monofunctional polymerizable monomers and polyfunctional polymerizable monomers exemplified for resin A. Preferred herein is for instance n-butyl acrylate.

State in Which the Organosilicon Polymer is Present in the Toner Core Particle

The toner particle comprises the organosilicon polymer on the surface of the toner core particle.

As described above, the toner core particle comprises the resin A, and the resin A has monomer unit M2 that comprises an organosilicon polymer segment. The organosilicon polymer segment comprised in the monomer unit M2 is preferably present on the surface of the toner core particle, from the viewpoint of charge rise-up.

Specifically, formula (6) below is satisfied, where a peak intensity of Si is denoted by P(Si) and a total peak intensities of all ions in the toner core particle is denoted by P(T), obtained by time-of-flight secondary ion mass spectrometry (TOF-SIMS) of the toner core particle, $$0.004 \le P(Si)/P(T) \le 0.040 \quad (6)$$

When P(Si)/P(T) lies within the above range, a large amount of the organosilicon polymer is present on the surface of the toner core particle, and as a result the charge rise-up of toner improves on account of a conductive effect, and image fogging is suppressed. The fixing surface becomes flatter and image glossiness is thus improved by the presence of the organosilicon polymer on the surface of the toner core particle.

The value of P(Si)/P(T) is preferably 0.008 or higher, and preferably 0.010 or higher. The value of P(Si)/P(T) is preferably 0.030 or lower, and preferably 0.020 or lower. For instance, the value of P(Si)/P(T) ranges preferably from 0.008 to 0.030, or from 0.010 to 0.020.

The value of P(Si)/P(T) can be raised by increasing the number of organosilicon polymer segments that are present on the surface of the toner core particle. Specifically, value of P(Si)/P(T) can be controlled by adjusting the method for adding a resin comprising an organosilicon polymer segment, or the method for adding and reacting a monomer having an organosilicon polymer segment, in a below-described polymerization step during the production of the toner.

The toner particle preferably has protruded portions on the surface of the toner core particle, and the protruded portions are preferably formed of an organosilicon polymer. The organosilicon polymer has a structure represented by formula (7) below such that in an observation of the toner particle surface using a scanning probe microscope, a number-average diameter R of the maximum diameter of the protruded portions ranges from 80 to 250 nm, and a number-average height H of the protruded portions ranges from 25 to 100 nm. Transferability can be improved when the above ranges are satisfied.

$$R—SiO_{3/2} \quad (7)$$

In formula (7), R represents an alkyl group, an alkenyl group, an acyl group, an aryl group or a methacryloxyalkyl group.

In a case where the number-average diameter R is 80 nm or larger, the contact area between the surface of the toner core particle and the protruded portions is not excessively small, and the forces received from a member at the time of fixing propagate readily from the protruded portions to the surface of the toner core particle, so that deformation at the initial stage of fixing is promoted.

In a case where the number-average diameter R is 250 nm or smaller, it becomes possible to prevent the surface area of the toner core particle that is covered per one protruded portion from becoming excessively large; this results in better low-temperature fixability.

The number-average diameter R is more preferably 90 nm or larger, and yet more preferably 100 nm or larger. The number-average diameter R is more preferably 200 nm or smaller, and yet more preferably 150 nm or smaller. For instance, the number-average diameter R ranges preferably from 90 to 200 nm, or from 100 to 150 nm.

The number-average diameter R can be increased by raising stepwise the pH condition of the condensation reaction of the organosilicon polymer at the time of formation of the forming protruded portions of the organosilicon polymer on the surface. The number-average diameter R can be reduced by increasing the pH at the time of the condensation reaction of the organosilicon polymer, or by lowering the concentration of the organosilicon polymer.

In a case where an average height H is 25 nm or larger, the surface area of the contact surface between the toner and a fixing roller does not become excessively large, the forces exerted on the toner can be concentrated on the contact surface, and deformation at the initial stage of fixing can be promoted.

In a case where the average height H is 100 nm or smaller, it becomes possible to prevent that the distance from the contact surface of the protruded portions with a member to the surface of the toner core particle should become excessively large; this results in better fixing performance.

The average height H is more preferably 30 nm or larger, and yet more preferably 40 nm or larger. The average height H is more preferably 80 nm or smaller, and yet more preferably 60 nm or smaller. For instance, the average height H ranges preferably from 30 to 80 nm, or from 40 to 60 nm.

The average height H can be increased by increasing the concentration of the organosilicon polymer at the time of formation of the protruded portions on the surface by the organosilicon polymer. Conversely, the average height H can be reduced by lowering the concentration of the organosilicon polymer at the time of formation of the protruded portions on the surface by the organosilicon polymer.

Conventionally known organosilicon compounds can be used, without particular limitations, as the organosilicon compound for obtaining the organosilicon polymer. Preferred among the foregoing is at least one organosilicon compound selected from the group consisting of organosilicon compounds represented by formula (9) below.

$$R{-}Si{-}R^a{}_3 \quad (9)$$

In formula (9), $R^a$ each independently represents a halogen atom or an alkoxy group, and R represents an alkyl group, an alkenyl group, an aryl group, an acyl group or a methacryloxyalkyl group.

Concrete examples of such silane compounds include the following.

Trifunctional methylsilanes such as methyltrimethoxysilane, methyltriethoxysilane, methyldiethoxymethoxysilane, methylethoxydimethoxysilane; trifunctional silanes such as ethyltrimethoxysilane, ethyltriethoxysilane, ethyltrichlorosilane, ethyltriacetoxysilane, ethyltrihydroxysilane, propyltrimethoxysilane, propyltriethoxysilane, butyltrimethoxysilane, butyltriethoxysilane, hexyltrimethoxysilane, hexyltriethoxysilane; trifunctional phenylsilanes such as phenyltrimethoxysilane, phenyltriethoxysilane; trifunctional silane compounds, for instance trifunctional vinylsilane compounds such as vinyltrimethoxysilane and vinyltriethoxysilane; trifunctional allylsilane compounds such as allyltrimethoxysilane, allyltriethoxysilane, allyldiethoxymethoxysilane and allylethoxydimethoxysilane; and trifunctional γ-methacryloxypropylsilane compounds such as γ-methacryloxypropyltrimethoxysilane, γ-methacryloxypropyltriethoxysilane, γ-methacryloxypropyldiethoxymethoxysilane and γ-methacryloxypropylethoxydimethoxysilane.

The toner core particle may contain a colorant. Examples of the colorant include magenta colorants, cyan colorants, yellow colorants and black colorants.

Examples of magenta pigments include C. I. Pigment Red 3, 5, 17, 22, 23, 38, 41, 112, 122, 123, 146, 149, 150, 178, 179, 190, 202, C. I. Pigment Violet 19 and 23.

Examples of cyan coloring pigments include C. I. Pigment Blue 15, 15:1 and 15:3, and copper phthalocyanine pigments in which the phthalocyanine skeleton is substituted with 1 to 5 phthalimidemethyl groups.

Examples of yellow pigments include C. I. Pigment Yellow 1, 3, 12, 13, 14, 17, 55, 74, 83, 93, 94, 95, 97, 98, 109, 110, 154, 155, 166, 180, 185.

Examples of black colorants that can be used include carbon black, aniline black, acetylene black and titanium black, as well as colorants that are color-matched to black using a yellow, magenta or cyan colorant.

These colorants can be used singly or in mixtures thereof, and also in a solid solution state. The colorant is selected from the viewpoint of hue angle, chroma, lightness, light fastness, OHP transparency, and dispersibility in the toner particle. The content of the colorant is preferably from 1 to 20 parts by mass relative to 100 parts by mass of the binder resin or the polymerizable monomers that form the binder resin.

A magnetic material can also be used as the black colorant. Examples of magnetic materials include magnetite, hematite and ferrite. When a magnetic material is used as the black colorant, it is preferable to use a magnetic material having undergone a hydrophobizing treatment. Examples of hydrophobizing agents used in that case include silane coupling agents and titanium coupling agents.

The number-average particle diameter of the magnetic material is preferably of 2 μm or smaller, and is more preferably from 0.1 to 0.5 μm. Preferably there are used from 40 to 150 parts by mass of the magnetic material relative to 100 parts by mass of the binder resin or the polymerizable monomers that form the binder resin.

The toner core particle may comprise a release agent. As the release agent there can be used a known release agent, without particular limitations. Concrete examples include the following.

Hydrocarbon waxes and derivatives thereof, such as low molecular weight polyethylene, low molecular weight polypropylene, microcrystalline wax and paraffin wax; oxides of aliphatic hydrocarbon waxes such as oxidized polyethylene wax; block copolymers of aliphatic hydrocarbon waxes; ester waxes having a fatty acid ester as a main component, such as carnauba wax, Sasol wax and montanate ester wax; partially or fully deoxidized fatty acid esters, such as deoxidized carnauba wax; partially esterified products of fatty acids and polyhydric alcohols, such as behenic acid monoglyceride; and methyl ester compounds having hydroxyl groups and obtained through hydrogenation of for instance plant-based oils and fats.

The content of the release agent is preferably from 2.5 to 40.0 parts by mass, and more preferably from 3.0 to 15.0 parts by mass, relative to 100 parts by mass of the binder resin. These release agents may be used singly or in combinations of two or more types; preferably a hydrocarbon wax and an ester wax are used concomitantly, from the viewpoint of fixing performance. In a case where two or more types of release agents are used concomitantly, the total content of the release agents lies preferably within the above ranges.

The toner core particle preferably comprises a plasticizer. The plasticizer preferably comprises an ester compound of a diol with 2 to 6 carbon atoms and an aliphatic monocarboxylic acid with 14 to 22 carbon atoms.

Through the use of a plasticizer that satisfies the above feature, the resin made up mainly of the monomer unit M1 can be efficiently plasticized, and low-temperature fixability can be improved.

Plasticizers containing an ester compound of a diol with 2 to 6 carbon atoms and an aliphatic monocarboxylic acid with 14 to 22 carbon atoms that can be used include ethylene glycol distearate, ethylene glycol dibehenate, ethylene glycol dimyristate, ethylene glycol dilaurate, 1,4-butanediol distearate, hexanediol dimyristate, hexanediol dibehenate and hexanediol stearate.

The content of the plasticizer is preferably from 5 to 25 parts by mass, and more preferably 10 to 15 parts by mass, relative to 100 parts by mass of the binder resin or the polymerizable monomers.

A charge control agent may be used in the toner. The charge control agent allows stabilizing the charging performance of the toner. Various charge control agents conventionally used in toner applications can be used as the charge control agent.

The charge control agent is added in an amount that ranges from 0.01 to 10.00 parts by mass relative to 100 parts by mass of the binder resin or the polymerizable monomers.

A flowability improver may be added to the toner particle, with a view to improving the flowability of the toner particle. The flowability improver is not particularly limited, and known ones can be used. Concrete examples thereof include the following.

Fluorine-based resin powders such as a vinylidene fluoride fine powder or a polytetrafluoroethylene fine powder; fatty acid metal salts such as zinc sterate, calcium stearate or lead stearate; powders of metal oxides, such as a titanium oxide powder, an aluminum oxide powder or a zinc oxide powder, and powders resulting from hydrophobizing the foregoing metal oxides; a silica fine powder such as wet-method silica or dry-method silica, and a surface-treated silica fine powder resulting from surface-treating the foregoing silica fine powders using for instance a treatment agent such as a silane coupling agent, a titanium coupling agent or silicone oil.

The flowability improver is preferably added in an amount ranging from 0.01 to 5.00 parts by mass relative to 100 parts by mass of the toner particle. If the addition amount lies within the above range, a sufficient effect of improving flowability can be achieved while suppressing deterioration of fixing performance. The number-average particle diameter (D1) of the primary particles of the flowability improver is preferably from 4 to 120 nm.

The toner can be used in any developing scheme, as a single-component or two-component developer. In a case where toner is used as a two-component developer, the average particle diameter of the carrier is preferably from 10 to 100 m, and more preferably 20 to 50 m. In a case where a two-component developer is prepared by mixing the carrier and the toner, the toner concentration in the developer is preferably from about 2 to 15 mass %.

The weight-average particle diameter of the toner is not particularly limited, but is preferably from 4.0 to 11.0 m, and more preferably from 5.0 to 10.0 m. When the weight-average particle diameter lies within the above range, good flowability can be achieved, and a latent image can be developed faithfully.

Methods for producing a toner will be explained next, but the production method is not limited thereto.

A known method can be resorted to, without particular limitations, as the method for incorporating the resin A, comprising an organosilicon polymer segment, into the toner core particle.

For instance kneading pulverization methods include a method for kneading the resin A, which comprises an organosilicon polymer segment, together with a toner constituent material, and a method for causing the resin A comprising an organosilicon polymer segment to adhere to the surface of a toner base particle, followed by a thermal treatment, to fix the resin and yield a toner core particle.

Examples of wet production methods include a method for forming particles by dissolving the resin A comprising an organosilicon polymer segment together with a toner constituent material, a method for forming a toner base particle, and thereafter adding the resin A comprising an organosilicon polymer segment, with a thermal treatment for eliciting fixing of the resin and yield a toner core particle, and a method for adding a reactive organosilicon compound, at the time of particle diameter adjustment, together with a polymerization initiator, to thereby elicit incorporation into the toner base particle and yield a toner core particle.

Preferred among the foregoing is a suspension polymerization method, from the viewpoint of readily causing the resin A, comprising an organosilicon polymer segment, to be oriented on the surface of the toner core particle. A method for producing a toner particle in accordance with the above suspension polymerization method will be described next.

Firstly, a polymerizable monomer capable of forming a binder resin and, as needed, various materials, are mixed and are dissolved or dispersed using a disperser, to prepare a polymerizable monomer composition (dissolution step).

Examples of the above various materials include colorants, release agents, plasticizers, charge control agents, polymerization initiators and chain transfer agents.

Examples of the disperser include homogenizers, ball mills, colloidal mills and ultrasonic dispersers.

The polymerizable monomer composition is added next to an aqueous medium comprising a dispersion aid, and droplets of the polymerizable monomer composition are prepared (granulating step) using a high-speed disperser such as a high-speed stirrer or an ultrasonic disperser.

The polymerizable monomer in the droplets is thereafter polymerized, to yield a toner core particle (polymerization step).

The polymerization initiator may be mixed in at the time of preparation of the polymerizable monomer composition, or may be mixed into the polymerizable monomer composition immediately prior to formation of the droplets in the aqueous medium.

The polymerization initiator can be added, dissolved in the polymerizable monomers or another solvent, as the case may require, during granulation of the droplets or after granulation is complete, i.e., immediately prior to the start of the polymerization reaction.

After polymerization of the polymerizable monomer to yield a binder resin, a solvent removal treatment may be carried out, as needed, to obtain a toner core particle dispersion.

The resin comprising the organosilicon polymer segment may be (i) introduced at the time of the dissolution step; alternatively, (ii) once the polymerization step is over, a particle dispersion of the resin comprising the organosilicon polymer segment may then be added, and be fixed through heating.

Also, (iii) a polymerization initiator and a vinyl monomer comprising an organosilicon polymer segment may be added during the polymerization step, to thereby build the organosilicon polymer segment into the binder resin. The method in (ii) or (iii) is preferable herein, from the viewpoint of causing the organosilicon polymer segment to be disposed near the surface.

In a case where the binder resin is obtained for instance by emulsification aggregation or suspension polymerization, conventionally known monomers can be used, without particular limitations, as the polymerizable monomers. Specifically, the vinylic monomers exemplified concerning the binder resin can be used herein.

The method for incorporating the organosilicon polymer segment in the surface of the toner core particle is not particularly limited, and a known method can be resorted to.

One such method may involve adding a monomer comprising an organosilicon polymer segment, during the above-described polymerization step of the toner core particle, to obtain a toner core particle comprising a resin that has the organosilicon polymer segment. A further method may involve polymerizing a monomer comprising an organosilicon polymer segment in an aqueous medium in which a toner core particle has been dispersed, or a method that involves polymerizing beforehand a monomer that comprises an organosilicon polymer segment, and then adding the obtained polymer during the production process of the toner core particle, to thereby obtain a toner core particle that comprises a resin having the organosilicon polymer segment.

The monomer is not particularly limited so long as it comprises an organosilicon polymer segment, and known monomers can be used. Specific examples include the following.

Trifunctional silane compounds having a methacryloxyalkyl group as a substituent, such as γ-methacryloxypropyltrimethoxysilane, γ-methacryloxypropyltriethoxysilane, γ-methacryloxyoctyltrimethoxysilane, γ-methacryloxypropyldiethoxymethoxysilane and γ-methacryloxypropylethoxydimethoxysilane; trifunctional silane compounds having an acryloxyalkyl group as a substituent, such as γ-acryloxypropyltrimethoxysilane, γ-acryloxypropyltriethoxysilane, γ-acryloxyoctyltrimethoxysilane, γ-acryloxypropyldiethoxymethoxysilane and γ-acryloxypropylethoxydimethoxysilane.

A known dispersion stabilizer, surfactant or the like can be used as a dispersion aid utilized in the above granulating step. Concrete examples of the dispersion stabilizer include the following.

Inorganic dispersion stabilizers such as tricalcium phosphate, hydroxyapatite, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina; as well as organic dispersion stabilizers such as polyvinyl alcohol, gelatin, methyl cellulose, methyl hydroxypropyl cellulose, ethyl cellulose, sodium carboxymethyl cellulose and starch.

Examples of the surfactant include the following.

Anionic surfactants such as alkyl sulfate ester salts, alkylbenzene sulfonate salts and fatty acid salts; nonionic surfactants such as polyoxyethylene alkyl ethers and polyoxypropylene alkyl ethers; and cationic surfactants such as alkylamine salts and quaternary ammonium salts.

Among the foregoing, the dispersion preferably comprises an inorganic dispersion stabilizer, more preferably a dispersion stabilizer that includes a phosphate salt such as tricalcium phosphate, hydroxyapatite, magnesium phosphate, zinc phosphate or aluminum phosphate.

A known polymerization initiator can be used, without particular limitations, as the polymerization initiator. Concrete examples include the following. Peroxide-based polymerization initiators typified by hydrogen peroxide, acetyl peroxide, cumyl peroxide, tert-butyl peroxide, propionyl peroxide, benzoyl peroxide, chlorobenzoyl peroxide, dichlorobenzoyl peroxide, bromomethyl benzoyl peroxide, lauroyl peroxide, ammonium persulfate, sodium persulfate, potassium persulfate, diisopropyl peroxycarbonate, tetralin hydroperoxide, 1-phenyl-2-methylpropyl-1-hydroperoxide, pertriphenyl acetate-tert-butyl hydroperoxide, tert-butyl performate, tert-butyl peracetate, tert-butyl perbenzoate, tert-butyl perphenylacetate, tert-butyl permethoxyacetate, N-(3-tolyl)perpalmitate-tert-butyl benzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide and lauroyl peroxide; and azo-based or diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-hydroxy-2,4-dimethylvaleronitrile and azobisisobutyronitrile.

The toner of the present disclosure can be used in conventionally known image forming apparatuses, without particular limitations. Examples of image forming apparatuses according to a single-component contact development scheme, a two-component development type or a single-component jumping development scheme can be used.

Methods for measuring various physical properties will be described next.

Separation of the Resin A and the Resin B from Toner

The respective physical properties can also be measured using materials such as the resin A and the resin B isolated from the toner in accordance with the following method.

Herein 10.0 g of a toner particle are weighed, laid on tubular filter paper (No. 84, by Toyo Roshi Kaisha Ltd.), and are set in a Soxhlet extractor. Extraction is performed for 20 hours using 200 mL of THF as the solvent; the solid fraction obtained upon removal of solvent from the extract is a THF-soluble fraction of the toner. The resin A and the resin B are included in the THF-soluble fraction. The above is performed multiple times, to yield the required amount of THF-soluble fraction.

Gradient preparative HPLC (LC-20AP high-pressure gradient preparative system, by Shimadzu Corporation; SunFire preparative column 50 mmφ250 mm, by Waters Corporation) is used in a solvent gradient elution method. The column temperature is 30° C., the flow rate is 50 mL/min, and acetonitrile is used as the poor solvent and THF as the good solvent in the mobile phase. A sample obtained by dissolving, in 1.5 mL of THF, 0.02 g of the THF-soluble fraction obtained through extraction is used herein as a sample for separation. The mobile phase starts from a composition of 100% acetonitrile; then 5 minutes after sample injection, the ratio of THF is increased by 4% each minute, so that the composition of the mobile phase reaches 100% THF in the course of 25 minutes. Components can be separated through drying of the obtained fractions.

Which fraction component is the resin A and which is the resin B can be discriminated herein in accordance with a below-described $^{1}$H-NMR measurement.

Method for Identifying Monomer Units Comprised in the Resin A and the Resin B, and Method for Measuring the Content Ratios of Monomer Units Herein $^{1}$H-NMR spectroscopy is relied upon to identify various monomer units in the resin A and the resin B. The content ratios of the respective monomer units comprised in the resins are measured in accordance with $^{1}$H-NMR under the conditions below.

Device: FT NMR device JNM-EX400 (manufactured by JEOL Ltd.)
Measurement frequency: 400 MHz
Pulse condition: 5.0 s
Frequency range: 10,500 Hz
Number of integrations: 64 times
Measurement temperature: 30° C.

Sample: a sample is prepared by placing 50 mg of the resin A or the resin B in a sample tube having an inner diameter of 5 mm, with addition of deuterated chloroform ($CDCl_3$) as a solvent, followed by dissolution in a thermostatic bath at 40° C.

Hereinafter, the resin A will be explained as an example.

From among peaks attributed to the constituent elements of the monomer unit M1, those peaks independent from peaks attributed to constituent elements of other monomer units are selected on the basis of the obtained $^1$H-NMR chart, and an integration value i1 of the selected peaks is calculated.

Similarly, from among peaks attributed to the constituent elements of the monomer unit M2, those peaks independent from peaks attributed to constituent elements of other monomer units are selected, and an integration value i2 of the selected peaks is calculated.

Similarly, from among peaks attributed to the constituent elements of the monomer unit M3, those peaks independent from peaks attributed to constituent elements of other monomer units are selected, and an integration value i3 of the selected peaks is calculated.

Herein there is calculated the integration value I1 of peaks attributed to the methylene groups of the polymer main chain of the resin comprising the monomer unit M1.

Similarly, there is calculated the integration value 12 of peaks attributed to the methylene groups of the polymer main chain of the resin comprising the monomer unit M2.

Similarly, there is calculated the integration value 13 of peaks attributed to the methylene groups of the polymer main chain of the resin comprising the monomer unit M3.

The content ratio of the monomer unit M1 is obtained as follows using the above integration values i1, i2, i3 and I1, I2, I3. Further, n1, n2, n3, N1, N2, N3 are the number of hydrogen atoms in the constituent components to which there are attributed the peaks of interest for each segment.

Herein n1 corresponds to i1, n2 corresponds to i2, n3 corresponds to i3, N1 corresponds to I1, N2 corresponds to I2, and N3 corresponds to I3.

$$\text{Content ratio (mol \%) of monomer unit } M1=\{(i1/n1)/(I1/N1)\}\times 100$$

Similarly, the content ratio of the monomer unit M2 and the monomer unit M3 is worked out as follows.

$$\text{Content ratio (mol \%) of monomer unit } M2=\{(i2/n2)/(I2/N2)\}\times 100$$

$$\text{Content ratio (mol \%) of monomer unit } M3=\{(i3/n3)/(I3/N3)\}\times 100$$

The resin B can also be analyzed in accordance with the same procedure.

Calculation of Tetrahydrofuran-Insoluble Fraction Contents of Resins and Toner

Herein 10 g of resin or toner are weighed, laid on tubular filter paper (No. 84, by Toyo Roshi Kaisha Ltd.), and Soxhlet extraction is performed with 200 ml of tetrahydrofuran (THF) for 20 hours. Thereafter, the tubular filter paper is retrieved and is and vacuum-dried at 40° C. for 20 hours, a residue mass is measured, and then a tetrahydrofuran (THF)-insoluble fraction amount of the toner (or resin) is calculated in accordance with the expression below.

$$\text{THF-insoluble fraction amount}=(\text{mass of residue}/\text{mass of toner (or resin) prior to Soxhlet extraction})\times 100\ (\text{mass \%})$$

Measurement of the Weight-Average Molecular Weight Mw of the Tetrahydrofuran-Soluble Fraction of Resins and Toner The weight-average molecular weights of resin and toner are measured by gel permeation chromatography (GPC), as follows.

Herein 200 mL of each THE solution used for measuring the above insoluble fraction amount are filtered through a solvent-resistant membrane filter "MYSYORI DISC" (by Tosoh Corporation) having a pore diameter of 0.2 m, to obtain a respective sample solution. The sample solution is adjusted so that the concentration of the THF-soluble component is about 0.8 mass %. This sample solution is used for measurement, under the conditions below.

Apparatus: HLC8120 GPC (detector: RI) (by Tosoh Corporation)

Column: 7 columns Shodex KF-801, 802, 803, 804, 805, 806, 807 (by Showa Denko)

Eluent: tetrahydrofuran (THF)

Flow rate: 1.0 mL/min

Oven temperature: 40.0° C.

Sample injection amount: 0.10 mL

To calculate the molecular weight of the sample there is used a molecular weight calibration curve created using a standard polystyrene resin (product name "TSK STANDARD POLYSTYRENE F-850, F-450, F-288, F-128, F-80, F-40, F-20, F-10, F-4, F-2, F-1, A-5000, A-2500, A-1000, A-500", by Tosoh Corporation).

Method for Measuring the Weight-Average Particle Diameter (D4) and Number-Average Particle Diameter (D1) of the Toner The measuring device used herein is a precision particle size distribution measuring device "Coulter Counter Multisizer 3" (registered trademark, by Beckman Coulter, Inc.) relying on a pore electrical resistance method and equipped with a 100 m aperture tube. Measurement conditions are set, and measurement data analyzed, using dedicated software (Beckman Coulter Multisizer 3, Version 3.51", by Beckman Coulter, Inc.) ancillary to the device. The measurements are performed in 25,000 effective measurement channels.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis.

On the "Standard Operating Method (SOMME) alteration" screen in the dedicated software, the total count number in control mode is set to 50,000 particles, the number of measurements is set to 1, and the Kd value is set to the value obtained by using "standard particle 10.0 m" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked.

On the "Conversion settings from pulse to particle diameter" screen in the dedicated software, the bin interval is set to logarithmic particle diameter, the particle diameter bin is set to 256 particle diameter bin, and the particle diameter range is set to from 2 to 60 m.

The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.

(2) Approximately 30 mL of the aqueous electrolyte solution is placed in a 100 mL glass flat bottomed beaker. Approximately 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.

(3) An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 1800 is prepared. 3.3 L of ion exchanged water is placed in a water bath in the ultrasonic dispersion system, and approximately 2 mL of Contaminon N is added to this water bath.

(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, approximately 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to approximately 5%. Measurements are carried out until the number of particles measured reaches 50,000.

(7) The weight-average particle diameter (D4) and the number-average particle diameter (D1) are calculated by analyzing measurement data using the accompanying dedicated software. The "AVERAGE DIAMETER" on the "ANALYSIS/VOLUME STATISTICAL VALUE (ARITHMETIC MEAN)" screen when the special software is set to graph/volume % is the weight average particle diameter (D4). The "AVERAGE DIAMETER" on the "ANALYSIS/NUMBER STATISTICAL VALUE (ARITHMETIC MEAN)" screen when the special software is set to graph/number % is the number average particle diameter (D1).

Identification of Unit Structures of the Organosilicon Polymer that Forms the Organosilicon Polymer Segment or Protruded Portions in the Resin A, and Measurement of the Proportions of Unit Structures Herein NMR is resorted to for identifying the organosilicon polymer segment in the resin A or the unit structure of the organosilicon polymer that forms the protruded portions on the toner particle surface, and for measuring the proportions of the unit structures.

The protruded portions of the organosilicon polymer separated from the toner or the resin A separated in accordance with above method are used as samples. The means for separating the protruded portions is as follows.

Herein 1 g of toner is placed in a vial, and is dissolved in 31 g of chloroform, to be dispersed. Dispersion is accomplished as a result of a treatment using an ultrasonic homogenizer for 30 minutes, to produce a dispersion.

Ultrasonication device: ultrasonic homogenizer VP-050 (by Taitec Co., Ltd.)

Microchip: step-type microchip, tip diameter φ2 mm

Tip position of microchip: central portion of glass vial, at a height of 5 mm from the bottom face of the vial Ultrasonic conditions: intensity 30%, 30 minutes Ultrasonic waves are applied herein while the vial is cooled in ice water so that the dispersion does not warm up.

The dispersion is transferred to a swing rotor glass tube (50 mL), and is centrifuged at 58.33 $s^{-1}$ for 30 minutes in a centrifuge (H-9R; by Kokusan Co., Ltd.).

To measure the toner, materials other than the protruded portions on the surface of the toner particle can be removed through sampling of the upper layer of the glass tube after centrifugation. A chloroform solution comprising the organosilicon polymer is collected, and the chloroform is removed by vacuum drying (40° C./24 hours), to thereby yield a sample of the organosilicon polymer that forms the protruded portions on the surface of the toner particle.

To measure the resin A, a sample is obtained by collecting the upper layer of the glass tube after centrifugation.

The above sample is then used for measuring and calculating, by solid-state $^{29}$Si-NMR, the abundance ratio of the unit structures in the resin comprising the organosilicon polymer, the proportion of silicon atoms with the T2 unit structure, and the proportion of silicon atoms with the T3 unit structure, relative to the total amount of silicon atoms in the organosilicon polymer.

The hydrocarbon group represented by R in the organosilicon polymer is ascertained by $^{13}$C-NMR.

Measurement Conditions of $^{13}$C-NMR (Solid State)

Device: JNM-ECX500II by JEOL Resonance Co., Ltd.

Sample tube: 3.2 mmφ

Sample: sample of resin A or organosilicon polymer that forms the protruded portions Measurement temperature: room temperature Pulse mode: CP/MAS Measured nucleus frequency: 123.25 MHz ($^{13}$C)

Reference substance: adamantane (external standard: 29.5 ppm)

Sample rotational speed: 20 kHz

Contact time: 2 ms

Delay time: 2 s

Number of scans: 1024 scans

The hydrocarbon group represented by R is ascertained, under the above conditions, on the basis of the presence or absence of a signal derived for instance from a methyl group ($Si—CH_3$), an ethyl group ($Si—C_2H_5$), a propyl group ($Si—C_3H_7$), a butyl group ($Si—C_4H_9$), a pentyl group ($Si—C_5H_{11}$), a hexyl group ($Si—C_6H_{13}$) or a phenyl group ($Si—C_6H_5$).

The structure bonded to Si in the organosilicon compound is identified by solid-state $^{29}$Si-NMR. In solid-state $^{29}$Si-NMR, peaks are detected in different shift regions depending on the structure of the functional group that is bonded to Si of each unit structure in the organosilicon polymer.

The structure that is bonded to Si can be identified by identifying respective peak positions using a standard sample. The abundance ratio of each unit structure can be calculated from the obtained peak area.

The concrete measurement conditions for solid-state $^{29}$Si-NMR are as follows.

Device: JNM-ECX5002 (by JEOL RESONANCE Co., Ltd.)

Temperature: room temperature

Measurement method: DD/MAS method $^{29}Si$ 450

Sample tube: zirconia 3.2 mmp

Sample: filled in a test tube, in a powder state

Sample rotational speed: 10 kHz

Relaxation delay: 180 s

Scan count: 2000 scans

After the measurement, from solid-state $^{29}Si$-NMR spectroscopy, a plurality of silane components having dissimilar substituents and dissimilar bonded groups in the organosilicon polymer of the resin or the toner particle are subjected to peak separation, by curve fitting, into an X1 structure, an X2 structure, an X3 structure and an X4 structure given below, and also peaks derived from respective structures such as the T2 unit structure and the T3 unit structure are separated.

Curve fitting is carried out using EXcalibur for Windows (registered trademark), version 4.2 (EX series) of software for JNM-EX400 by JEOL Ltd. Herein "1D Pro" from the menu icon is clicked, to read measurement data. Next, "Curve fitting function" is selected from "Command" on the menu bar, to perform curve fitting. Curve fitting is performed for each component, so as to minimize a difference (composite peak difference) between a composite peak obtained by combining the peaks obtained by curve fitting, and a peak of the result of the measurement.

The structure denoted by X3 below is the T3 unit structure in the present disclosure.

X1 structure: $(Ri)(Rj)(Rk)SiO_{1/2}$ (A1)

X2 structure: $(Rg)(Rh)Si(O_{1/2})_2$ (A2)

X3 structure: $RmSi(O_{1/2})_3$ (A3)

X4 structure: $Si(O_{1/2})_4$ (A4)

X1 Structure (A1)

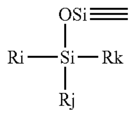

X2 Structure:

(A2)

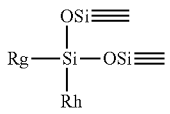

X3 Structure:

(A3)

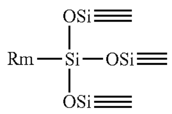

X4 Structure:

(A4)

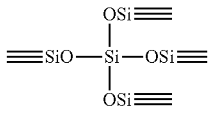

In formulae (A1), (A2) and (A3) above, Ri, Rj, Rk, Rg, Rh and Rm represent an organic group such as a hydrocarbon group having 1 to 6 carbon atoms, a halogen atom, a hydroxy group, an acetoxy group or an alkoxy group.

After peak separation, the total sum of all integration values of the D unit, the T unit and the Q unit present in the chemical shift lying in the range from −140 to 100 ppm is calculated, to yield a total of peak areas corresponding to silicon atoms in the organosilicon polymer segment.

In a case where the structure is to be ascertained in further detail, identification may be performed on the basis of measurement results by $^{1}H$-NMR, along with the above measurement results by $^{13}C$-NMR and $^{29}Si$-NMR.

Analysis Method by Time-of-Flight Secondary Ion Mass Spectrometry (TOF-SIMS)

The equipment used and the measurement conditions are given below.

Measuring device: nanoTOF II (product name, by ULVAC-PHI, Inc.)

Primary ion species: $Bi^{3++}$

Acceleration voltage: 30 kV

Primary ion current: 0.05 pA

Repeat frequency: 8.2 kHz

Raster mode: unbunch

Raster size: 100 μm×100 μm

Measurement mode: positive

Neutralization electron gun: used

Measurement time: 600 seconds

Sample preparation: toner core particle fixed on an indium sheet

Sample pretreatment: none

To perform the analysis on the basis of the toner particle, the toner particle is spread on cellophane tape (registered trademark, Nichiban Co., Ltd.), and the toner particle is further bonded to cellophane tape from above. The bonded cellophane tape is stripped off, and the cellophane tape with a residual toner particle is fixed to the indium sheet, for measurement. The measurement is performed using a scanning electron microscope (SEM), without vapor deposition, to check that a toner core particle having no protruded portions on the surface has been obtained.

An evaluation is performed, using Standard software (TOF-DR) by ULVAC-PHI, Inc., on the basis of the mass numbers of Si ions and fragment ions derived from the resin or organosilicon compounds in the toner core particle.

A peak intensity (P(Si)) derived from silicon with a mass number of 28 (m/z 28), and the sum total of peak intensities of all ions with mass numbers from 1 to 1850 (P(T)), are worked out.

Method for Measuring the Content of Resin A in the Toner

Identification of the structure and compositional analysis of the resin A in the toner can be accomplished herein using a nuclear magnetic resonance apparatus ($^{1}H$-NMR, $^{13}C$-NMR). The equipment used is described further on. The resin A separated from the toner in accordance with the above method is used as a sample.

Nuclear magnetic resonance apparatus ($^1$H-NMR, $^{13}$C-NMR)

Measuring device: FT NMR device JNM-EX400 (by JEOL Ltd.)

Measurement frequency: 400 MHz

Pulse condition: 5.0 s

Frequency range: 10500 Hz

Number of scans: 64 scans

The content of the resin A in the toner can be calculated by determining a molar composition ratio from a signal integration ratio (area ratio) in the NMR measurement. A weight composition ratio is calculated by multiplying the molar composition ratio by the molecular weight of the respective compound, and the content of the resin A in the toner is worked out from the result.

Method for Measuring the Average Height H and Average Diameter R of Protruded Portions on the Toner Particle Surface Protruded portions on the surface of the toner particle are observed in accordance with the method below.

Force curves for the protruded portions by the organosilicon polymer on the surface of the toner particle, and for the surface layer of the toner core particle, are derived through measurement using a scanning probe microscope (SPM) "AFM5500M" by Hitachi High-Technologies Corporation. Herein "SI-DF3P2" sold by Hitachi High-Tech Fielding Co., Ltd. is used as a cantilever (hereafter also referred to as a probe). The SPM used for the measurement is calibrated beforehand for positional accuracy in the XYZ directions, and also a tip curvature radius of the probe of the cantilever used for measurement is measured beforehand.

The radius of curvature of the tip of the probe is measured using a probe evaluation sample "TGT1-NT-MDT" sold by Hitachi High-Tech Fielding Corporation. The value of the radius of curvature of the tip is selected so that the toner core particle surface layer can be measured without contact against the protruded portions. A value of 7 nm is adopted in the present disclosure.

Measurements are made in a dynamic force mode. In the measurement of toner particle, firstly a conductive double-sided tape is affixed to a sample stand of a scanning probe microscope, and a toner particle is sprinkled onto the tape. Excess toner particle is removed from the sample stand by air blowing, to produce a measurement sample. The shape of this sample is measured using a scanning probe microscope (AFM5500M), and the protruded portions and the surface of the toner core particle are identified and observed over a 1 μm×1 μm area on the toner particle surface.

Depressed portions at the time of shape measurement correspond to the surface of the toner core particle, whereas protruded portions correspond to the protruded portions of the toner particle.

As the toner particle there are selected 50 toner particles, as measurement targets, having a particle diameter equal to the weight-average particle diameter (D4) of the toner particle.

After shape measurement, the obtained 1 mx 1 m measurement data is corrected for tilt, and then there are calculated a surface maximum height Sp and a width Sz/Smax from a maximum crest to a minimum trough of the surface. Tilt correction of the measurement data is performed using AFM5000II, which is analysis software ancillary to AFM5500M, and the measurement data is corrected by being subjected to curved surface correction in the sequence of first-order curved surface correction, second-order curved surface correction and third-order curved surface correction. In the present disclosure, the measurement data is corrected for tilt by being analyzed in the sequence of first-order tilt correction (first-order curved surface correction), second-order tilt correction (second-order curved surface correction), and third-order tilt correction (third-order curved surface correction) in the above analysis software.

Herein Sp signifies the maximum height from the outermost surface of the toner particle up to the apex of a protruded portion, in a 1 μm×1 μm area, and Sz/Smax signifies the maximum diameter of the protruded portion. Further, Sp can be calculated by referring to a Sp value that is displayed upon running of surface roughness analysis, for the tilt-corrected data, in the analysis tab of the analysis software. With the obtained Sp as the height h1 (nm) of the protruded portion, the maximum heights h1 through h50 of the protruded portion apices of the 50 toner particle are worked out in accordance with the above method, whereupon the number-average value of h1 to h50 is taken as the average height H (nm) of the protruded portions.

Also, Sz/Smax can be calculated by referring to the Sz/Smax value that is displayed upon running of the surface roughness analysis, for the tilt-corrected data, in the analysis tab of the analysis software. With the obtained Sz/Smax as a maximum diameter r1 (nm) of a protruded portion, the maximum diameters r1 through r50 of the protruded portions of the 50 toner particles are worked out in accordance with the above method, and the number-average value of r1 through r50 is taken as the average diameter R (nm) of the protruded portions.

Method for Identifying a Plasticizer in the Toner Particle

Identification of the structure and compositional analysis of the plasticizer in the toner particle can be accomplished herein using a nuclear magnetic resonance apparatus ($^1$H-NMR, $^{13}$C-NMR). The equipment used is described further on. The toner particle separated from the toner in accordance with the above method is used as a sample.

Nuclear magnetic resonance apparatus ($^1$H-NMR, $^{13}$C-NMR)

Measuring device: FT NMR device JNM-EX400 (by JEOL Ltd.)

Measurement frequency: 400 MHz

Pulse condition: 5.0 s

Frequency range: 10500 Hz

Number of scans: 64 scans

EXAMPLES

The present invention will be described in more detail hereinbelow with reference to Examples and Comparative Examples, but the present invention is not limited thereto. Unless otherwise specified, the "parts" and the "%" used in the examples are based on mass.

Production Example of an Aqueous Dispersion of Resin A-1

A reaction vessel equipped with a stirrer, a condenser, a thermometer and a nitrogen introduction tube was charged with 200 parts of xylene, with reflux of the vessel under a nitrogen stream. The following materials were mixed, as monomers, and were added dropwise into the reaction vessel while under stirring; the whole was then held for 10 hours.

Styrene monomer 72.0 parts

Butyl acrylate 25.0 parts

Lauryl acrylate 3.0 parts 3-(trimethoxysilyl)propyl methacrylate 0.08 parts

Thereafter, the solvent was removed by distillation, followed by drying at 40° C. under reduced pressure to yield a vinyl resin. A reaction vessel equipped with a stirrer, a condenser, a thermometer and a nitrogen introduction tube was charged with 200.0 parts of methyl ethyl ketone; then 99.88 parts of the vinyl resin obtained above and 0.12 parts of methyltrimethoxysilane were added and dissolved therein.

Next, 40.0 parts of a 1.0 mol/L aqueous solution of potassium hydroxide were added stepwise, with stirring for 1 minute, after which 500.0 parts of ion-exchanged water were dropped stepwise, to elicit emulsification.

The obtained emulsion was distilled under reduced pressure, to remove the solvent, and ion-exchanged water was added to adjust the resin concentration to 20%, and yield thereby an aqueous dispersion of Resin A-1.

Production Examples of Aqueous Dispersions of Resin A-2 to Resin A-13

Aqueous dispersions of Resin A-2 to Resin A-13 were obtained in the same way as in in the production example of the aqueous dispersion of Resin A-1, but herein the type and amount of the various monomers used in the aqueous dispersion of Resin A-1 were modified as given in Table 1.

Production Example of Resin A-14

Main Resin Production Process

An autoclave equipped with a pressure-reducing device, a water separation device, a nitrogen gas introduction device, a temperature measurement device and a stirring device was charged with the materials below, and a reaction was carried out for 5 hours, under a nitrogen atmosphere, at normal pressure and at 200° C.

Propylene oxide 2.0-mole adduct of bisphenol A 71.2 parts

Terephthalic acid 28.0 parts

Titanium tetrabutoxide 0.2 parts

Thereafter, the following materials were added and caused to react at 220° C. for 3 hours.

Trimellitic acid 0.8 parts

Titanium tetrabutoxide 0.3 parts

The reaction was further carried out for 2 hours under reduced pressure of 10 to 20 mmHg. The obtained resin was dissolved in chloroform, and the solution was added dropwise onto ethanol, to elicit reprecipitation, followed by filtering to yield a main polyester resin.

Amidation Step

Then 100.0 parts of the above polyester resin were dissolved in 400.0 parts of N,N-dimethylacetamide, and the materials below were added and caused to react through stirring at normal temperature for 5 hours.

3-aminopropyltrimethoxysilane 2.00 parts

Triethylamine 3.7 parts

Condensing agent (DMT-MM: 4-(4,6-dimethoxy-1,3,5-triazin-2-yl)-4-methylmorpholinium chloride) 3.7 parts Once the reaction was over, the resulting product was added dropwise to methanol, to elicit reprecipitation, followed by filtration to produce Resin A-14 resulting from amidation of carboxy groups of the polyester and amino groups in the aminosilane.

Table 2 sets out the physical properties of the obtained Resin A-14.

TABLE 1

| | Monomer 1 | | Monomer 2 | | Monomer 3 | | Monomer 4 | | Monomer 5 | |
|---|---|---|---|---|---|---|---|---|---|---|
| Resin | Type | Addition amount (parts) | Type | Addition amount (parts) | Type | Addition amount (parts) | Type | Addition amount (parts) | Type | Addition amount (parts) |
| A-1 | Styrene | 72.0 | Butyl acrylate | 25.0 | Lauryl acrylate | 3.0 | 3-methacryloxy propyltrimethoxysilane | 0.08 | Methyl-methoxysilane | 0.12 |
| A-2 | Styrene | 67.0 | Butyl acrylate | 15.0 | Ethyl acrylate | 18.0 | 3-methacryloxy propyltrimethoxysilane | 0.08 | Methyl-methoxysilane | 0.12 |
| A-3 | Styrene | 74.0 | 2-ethylhexyl acrylate | 21.0 | Lauryl acrylate | 5.0 | 3-methacryloxy propyltrimethoxysilane | 0.08 | Methyl-methoxysilane | 0.12 |
| A-4 | Styrene | 72.0 | Butyl acrylate | 25.0 | Lauryl acrylate | 3.0 | 3-methacryloxy propyltrimethoxysilane | 0.02 | Methyl-methoxysilane | 0.03 |
| A-5 | Styrene | 72.0 | Butyl acrylate | 25.0 | Lauryl acrylate | 3.0 | 3-methacryloxy propyltrimethoxysilane | 0.40 | Methyl-methoxysilane | 0.6 |
| A-6 | Styrene | 72.0 | Butyl acrylate | 25.0 | Lauryl acrylate | 3.0 | 3-methacryloxy propyltrimethoxysilane | 0.25 | Methyl-methoxysilane | 1.65 |
| A-7 | Styrene | 72.0 | Butyl acrylate | 25.0 | Lauryl acrylate | 3.0 | 3-methacryloxy propyltrimethoxysilane | 0.08 | Methyl-methoxysilane | 0.31 |
| A-8 | Styrene | 72.0 | Butyl acrylate | 25.0 | Lauryl acrylate | 3.0 | 3-methacryloxy propyltrimethoxysilane | 0.16 | Methyl-methoxysilane | 0.84 |
| A-9 | Styrene | 60.0 | Methyl methacrylate | 12.0 | Butyl acrylate | 28.0 | 3-methacryloxy propyltrimethoxysilane | 0.02 | Methyl-methoxysilane | 0.03 |
| A-10 | Styrene | 83.0 | Butyl acrylate | 7.0 | Lauryl acrylate | 10.0 | 3-methacryloxy propyltrimethoxysilane | 0.01 | Methyl-methoxysilane | 0.02 |
| A-11 | Styrene | 72.0 | Butyl acrylate | 25.0 | Lauryl acrylate | 3.0 | 3-methacryloxy propyltrimethoxysilane | 0.32 | Methyl-methoxysilane | 1.84 |
| A-12 | Styrene | 72.0 | Butyl acrylate | 25.0 | Lauryl acrylate | 3.0 | 3-methacryloxy propyltrimethoxysilane | 0.08 | Methyl-methoxysilane | 1.8 |
| A-13 | Styrene | 72.0 | Butyl acrylate | 25.0 | Lauryl acrylate | 3.0 | 3-methacryloxy propyltrimethoxysilane | 0.20 | — | — |
| A-14 | PO 2-mole adduct of Bisphenol A | 71.2 | Terephthalic acid | 28.0 | Trimellitic acid | 0.8 | 3-aminopropyl trimethoxysilane | 2.00 | Triethylamine | 3.7 |

TABLE 2

| Resin | A/B | A + B | weight-average molecular weight Mw | THF-insoluble fraction content (mass %) |
|---|---|---|---|---|
| A-1 | 0.3 | 82 | 74,900 | 0 |
| A-2 | 0.3 | 82 | 71,700 | 0 |
| A-3 | 0.3 | 82 | 76,500 | 0 |
| A-4 | 0.3 | 82 | 75,000 | 0 |
| A-5 | 0.3 | 82 | 73,700 | 0 |
| A-6 | 2.5 | 80 | 74,500 | 0 |
| A-7 | 1.1 | 62 | 78,300 | 0 |
| A-8 | 1.8 | 91 | 72,200 | 0 |
| A-9 | 0.3 | 82 | 123,200 | 0 |
| A-10 | 0.4 | 75 | 127,400 | 0 |
| A-11 | 2.5 | 90 | 120,000 | 0 |
| A-12 | 2.8 | 92 | 12,700 | 65 |
| A-13 | 0 | 0 | 52,500 | 0 |
| A-14 | 2.5 | 92 | 20,000 | 0 |

In Table 2, the weight-average molecular weight Mw denotes the weight-average molecular weight Mw of a tetrahydrofuran-soluble fraction of each resin.

Production Example of Resin B-1

A reaction vessel equipped with a stirrer, a condenser, a thermometer and a nitrogen introduction tube was charged with 200 parts of xylene, with reflux of the vessel under a nitrogen stream. As monomers, the following materials were mixed, were added dropwise into the reaction vessel with stirring, and were held for 10 hours.

| | |
|---|---|
| Styrene monomer | 98.0 parts |
| Butyl acrylate | 2.0 parts |

Thereafter, the solvent was removed by distillation, followed by drying at 40° C. under reduced pressure, to yield Resin B-1 having a weight-average molecular weight of 3000.

Production Examples of Resins B-2 to B-4

Resins B-2 to B-4 were obtained in the same way as in the production example of Resin B-1, but herein the monomer composition of Resin B-1 was modified as given in Table 3.

TABLE 3

| | Monomer 1 | | Monomer 2 | | weight-average | THF-insoluble |
|---|---|---|---|---|---|---|
| Resin | Type | Addition amount (parts) | Type | Addition amount (parts) | molecular weight Mw | fraction content (mass %) |
| B-1 | Styrene | 98.0 | Butyl acrylate | 2.0 | 3000 | 0 |
| B-2 | Styrene | 85.0 | 2-ethylhexyl acrylate | 15.0 | 5000 | 0 |
| B-3 | Styrene | 100.0 | — | — | 2000 | 0 |
| B-4 | Styrene | 75.0 | 2-ethylhexyl acrylate | 25.0 | 3000 | 0 |

In Table 3, the weight-average molecular weight Mw denotes the weight-average molecular weight Mw of a tetrahydrofuran-soluble fraction of each resin.

Production Example of Polyester Resin A

An autoclave equipped with a pressure-reducing device, a water separation device, a nitrogen gas introduction device, a temperature measurement device and a stirring device was charged with the materials below, and a reaction was carried out for 5 hours under a nitrogen atmosphere, at normal pressure and at 200° C.

Propylene oxide 2.0-mole adduct of bisphenol A 71.2 parts

| | |
|---|---|
| Terephthalic acid | 28.0 parts |
| Titanium tetrabutoxide | 0.2 parts |

Thereafter, the following materials were added and caused to react at 220° C. for 3 hours.

| | |
|---|---|
| Trimellitic acid | 0.8 parts |
| Titanium tetrabutoxide | 0.3 parts |

The reaction was further carried out for 2 hours under reduced pressure of 10 to 20 mmHg. The obtained resin was dissolved in chloroform, and the solution was added dropwise onto ethanol, to elicit reprecipitation, followed by filtering to yield a polyester resin having a weight-average molecular weight of 15000 and comprising no THF-insoluble fraction.

Toner Production Examples

Production Example of Toner 1

Toner Composition Preparation Step
Preparation of Polymerizable Monomer Composition 1

| | |
|---|---|
| Styrene | 25.0 parts |
| Carbon black | 5.0 parts |

The above materials were added into an attritor (by Nippon Coke & Engineering Co., Ltd.), with dispersion at 220 rpm for 5.0 hours using zirconia particles having a diameter of 1.7 mm, after which the zirconia particles were removed, to prepare Colorant-dispersed solution 1 having a pigment dispersed therein.

The following materials were added next to Colorant-dispersed solution 1.

| | |
|---|---|
| Styrene | 47.0 parts |
| n-butyl acrylate | 24.7 parts |
| Lauryl acrylate | 3.0 parts |
| Hexanediol diacrylate | 0.1 part |

| | |
|---|---|
| Polyester resin A | 2.0 parts |
| Resin B-1 | 10.0 parts |
| Release agent (hydrocarbon wax, melting point: 79° C.) | 5.0 parts |
| Plasticizer (ethylene glycol distearate) | 10.0 parts |

As a dissolution/dispersion step, the above materials were next kept at 65° C., and were dissolved and dispersed uniformly at 500 rpm using T. K. Homomixer, to prepare Polymerizable monomer composition 1.

Preparation of Aqueous Medium 1

Herein 11.2 parts of sodium phosphate (dodecahydrate) were added into a reaction vessel comprising 390.0 parts of ion-exchanged water, and the whole was kept at 65° C. for 1.0 hour while under purging with nitrogen. Stirring was performed at 12000 rpm using a T. K. homomixer (by Tokushu Kika Kogyo Co., Ltd.). While stirring was maintained, an aqueous solution of calcium chloride resulting from dissolving 7.4 parts of calcium chloride (dihydrate) in 10.0 parts of ion-exchanged water was added, all at once, into the reaction vessel, to prepare an aqueous medium that comprised a dispersion stabilizer. Further, 1.0 mol/L hydrochloric acid was added to the aqueous medium in the reaction vessel, to adjust the pH to 6.0 and prepare Aqueous medium 1.

Granulating Step

While the temperature of Aqueous medium 1 was maintained at 70° C. and the rotational speed of the stirrer was maintained at 12500 rpm, Polymerizable monomer composition was added to Aqueous medium 1, and 7.0 parts of the polymerization initiator t-butyl peroxypivalate were further added. Granulation was carried out for 10 minutes while maintaining 12500 rpm as it was, using the stirrer.

Polymerization Step I

The stirrer was changed over from a high-speed stirrer to a stirrer provided with a propeller stirring blade, and then a polymerization reaction was conducted by performing polymerization for 5.0 hours, with the temperature held at 70° C. and while under stirring at 200 rpm.

Polymerization Step II

Once polymerization step I was over, the temperature was raised to 85° C., and, 0.08 parts of 3-methacryloxypropyltrimethoxysilane and 0.12 parts of methyltrimethoxysilane were added, and the whole was stirred for 5 minutes, with the temperature held at 85° C. Thereafter, 1.0 part of a 0.1 mass % aqueous solution of potassium persulfate was further added, and a polymerization reaction was carried out for 1 hour. After 1 hour, a 1 mol/L aqueous solution of sodium hydroxide was added, to adjust the pH to 9.0.

The temperature was raised up to 98° C., and heating was performed for 3.0 hours, to remove residual monomers, after which the temperature was lowered down to 55° C.

Surface Treatment Step II

Ion-exchanged water warmed at 55° C. was added to the obtained slurry, to adjust the slurry concentration to 30.0%. Thereafter, 4.0 parts of methyltrimethoxysilane were added to the slurry having had the concentration thereof adjusted, and a 1 mol/L aqueous solution of sodium hydroxide was added, to adjust the pH to 9.5. After adjustment of the pH, the temperature was maintained at 55° C. for 5.0 hours while under continued stirring. The temperature was then lowered to 25° C.

Washing Step

The slurry obtained in accordance with the above method was adjusted to pH 1.5 using 1 mol/L hydrochloric acid, and was stirred for 1.0 hour; this was followed by filtration while under washing with ion-exchanged water, and by drying, to yield Toner 1.

Tables 4-1, 4-2 and Table 5 set out the constituent materials and process conditions of Toner 1, and Table 6-1, Table 6-2 and Tables 7-1 and 7-2 set out the physical properties of the toner.

Production Examples of Toners 2 to 6, 15, 24 and 31 to 33 Toners 2 to 6, 15, 24 and 31 to 33 were obtained in the same way as in the production example of Toner 1, but herein the constituent materials of the toner were modified to those of Tables 4-1 and 4-2, and the conditions in the various steps to those given in Table 5.

The physical properties of the obtained Toners 2 to 6, 15, 24 and 31 to 33 are set out in Table 6-1 and Table 6-2.

Production Example of Toner 7

Toner Composition Preparation Step, Granulating Step and Polymerization Step I

A toner composition preparation step, a granulating step, and a polymerization step I were carried out in the same way as in the production example of Toner 1, but using herein the toner constituent materials given in Tables 4-1 and 4-2.

Polymerization Step III

Once polymerization step I was over, the temperature was raised to 98° C., and heating was carried out for 4.0 hours to remove residual monomers. The temperature was thereafter lowered to 25° C.

Surface Treatment Step I

While the slurry obtained in the polymerization step III was stirred, an aqueous solution of sodium carbonate was added thereto, to adjust the pH to 8.5. An aqueous dispersion of Resin A-1 was further added, so that the solids addition amount was 5.0 parts, and the whole was stirred for 15 minutes. The temperature of the dispersion of the toner core particle having resin particles adhered thereto was raised next to 80° C., through heating, and was maintained at that temperature, with continued stirring for 1 hour. This was followed by cooling down to 55° C.

Surface Treatment Step II

Ion-exchanged water warmed at 55° C. was added to the slurry obtained in surface treatment step I, to adjust the slurry concentration to 30.0%. Thereafter, 4.0 parts by mass of methyltrimethoxysilane were added to the slurry having had the concentration thereof adjusted, and a 1 mol/L aqueous solution of sodium hydroxide was added to adjust the pH to 9.5. After adjustment of the pH, the temperature was maintained at 55° C. for 5.0 hours while under continued stirring. The temperature was then lowered to 25° C.

Washing Step

The slurry obtained in accordance with the above method was adjusted to pH 1.5 using 1 mol/L hydrochloric acid, and was stirred for 1.0 hour; this was followed by filtration while under washing with ion-exchanged water, and by drying, to yield Toner 7.

Tables 4-1, 4-2 and Table 5 set out the constituent materials and process conditions of Toner 7, and Table 6-1 and Table 6-2 set out the physical properties of the toner.

Production Examples of Toners 8 to 10, 12 to 14, 18 to 23, 26, 28 and 29

Toners 8 to 10, 12 to 14, 18 to 23, 26, 28 and 29 were obtained in the same way as in the production example of Toner 7, but herein the constituent materials of the toner in the production example of Toner 7 were modified to those of Table 3, and the conditions in the various steps to those given in Table 5.

The physical properties of the obtained Toners 8 to 10, 12 to 14, 18 to 23, 26, 28 and 29 are set out in Table 6-1 and Table 6-2.

Production Example of Toner 11

Toner Composition Preparation Step, Granulating Step, Polymerization Step I and Polymerization Step III Herein a toner composition preparation step, a granulating step, and a polymerization step I were carried out in the same way as in production example of Toner 1, but using herein the toner constituent materials given in Table 3. A polymerization step III was carried out in the same way as in the production example of Toner 7.

Washing Step

The slurry obtained in the polymerization step III was cooled down to 55° C., with stirring for 5 hours, followed by further cooling down to 25° C. The cooled slurry was adjusted to pH 1.5 using 1 mol/L hydrochloric acid, with stirring for 1.0 hour; this was followed by filtration while under washing with ion-exchanged water, and by drying, to yield Toner particle 11.

External Addition Step

To 100 parts of the obtained Toner particle 11 there were added 4.0 parts of sol-gel silica fine particles having been surface-treated with 25 mass % of hexamethyldisilazane and having a number-average particle diameter of 40 nm of primary particles, and the whole was mixed in a Henschel mixer (model FM-10, by Mitsui Miike Engineering Corporation), to yield Toner 11. The temperature in the Henschel mixer was adjusted so that the temperature of the mixture was 30° C.

The physical properties of the obtained Toner 11 are given in Table 6-1 and Table 6-2.

Production Examples of Toners 16, 17, 27 and 30

A toner composition preparation step, a granulating step, and a polymerization step I were carried out in the same way as in production example of Toner 1, but using herein the toner constituent materials given in Tables 4-1 and 4-2, and a polymerization step III was carried out in the same way as in the production example of Toner 7. Thereafter, a surface treatment step II and a washing step were carried out in the same way as in the production example of Toner 1, to yield Toners 16, 17, 27 and 30.

Tables 4-1, 4-2 and Table 5 set out the constituent materials and process conditions of the obtained Toners 16, 17, 27 and 30, and Tables 6-1 and 6-2 set out the physical properties of the toners.

Production Example of Toner 25

A toner composition preparation step, a granulating step, and a polymerization step I were carried out in the same way as in production example of Toner 1, but using herein the toner constituent materials given in Tables 4-1 and 4-2, and a polymerization step III was carried out in the same way as in the production example of Toner 7. Thereafter a washing step and an external addition step were carried out in the same way as in the production example of Toner 11, to yield Toner 25.

Tables 4-1 and 4-2 and Table 5 set out the constituent materials and process conditions of the obtained Toner 25, and Tables 6-1 and 6-2 set out the physical properties of the toner.

TABLE 4-1

| | | Toner Composition Preparation Step | | |
|---|---|---|---|---|
| | Toner | Styrene Addition amount (parts) | Butyl acrylate Addition amount (parts) | Lauryl acrylate Addition amount (parts) |
| Example 1 | 1 | 72.0 | 24.7 | 3.0 |
| Example 2 | 2 | 72.0 | 21.7 | 6.0 |
| Example 3 | 3 | 72.0 | 21.7 | 6.0 |
| Example 4 | 4 | 72.0 | 24.7 | 3.0 |
| Example 5 | 5 | 72.0 | 24.7 | 3.0 |
| Example 6 | 6 | 72.0 | 24.7 | 3.0 |
| Example 7 | 7 | 72.0 | 24.9 | 3.0 |
| Example 8 | 8 | 72.0 | 24.9 | 3.0 |
| Example 9 | 9 | 72.0 | 24.9 | 3.0 |
| Example 10 | 10 | 72.0 | 24.9 | 3.0 |
| Example 11 | 11 | 72.0 | 24.9 | 3.0 |
| Example 12 | 12 | 72.0 | 24.9 | 3.0 |
| Example 13 | 13 | 72.0 | 24.9 | 3.0 |
| Example 14 | 14 | 72.0 | 24.9 | 3.0 |
| Example 15 | 15 | 82.9 | 6.8 | 10.0 |
| Example 16 | 16 | 72.0 | 24.9 | 3.0 |
| Example 17 | 17 | 72.0 | 24.9 | 3.0 |
| Example 18 | 18 | 72.0 | 24.9 | 3.0 |
| Example 19 | 19 | 72.0 | 24.9 | 3.0 |
| Example 20 | 20 | 72.0 | 24.9 | 3.0 |
| Example 21 | 21 | 72.0 | 24.9 | 3.0 |
| Example 22 | 22 | 72.0 | 24.9 | 3.0 |
| Example 23 | 23 | 72.0 | 24.9 | 3.0 |
| Example 24 | 24 | 72.0 | 24.7 | 3.0 |
| Example 25 | 33 | 83.0 | 2 | 15.0 |
| Comperative Example 1 | 25 | 72.0 | 24.9 | 3.0 |
| Comperative Example 2 | 26 | 72.0 | 24.9 | 3.0 |
| Comperative Example 3 | 27 | 72.0 | 24.9 | 3.0 |
| Comperative Example 4 | 28 | 72.0 | 24.9 | 3.0 |
| Comperative Example 5 | 29 | 72.0 | 24.9 | 3.0 |
| Comperative Example 6 | 30 | 72.0 | 24.9 | 3.0 |
| Comperative Example 7 | 31 | 88.0 | 2 | 10.0 |
| Comperative Example 8 | 32 | 83.0 | 7 | 10.0 |

TABLE 4-2

| | | Toner Composition Preparation Step | | | | | | |
|---|---|---|---|---|---|---|---|---|
| | | Resin A | | Resin B | | Polyester resin A | Plasticizer | |
| | Toner | Type | Addition amount (parts) | Type | Addition amount (parts) | Addition amount (parts) | Type | Addition amount (parts) |
| Example 1 | 1 | — | — | Resin B-1 | 10.0 | 2.0 | Plasticizer 1 | 10.0 |
| Example 2 | 2 | — | — | — | — | 2.0 | Plasticizer 2 | 7.0 |
| Example 3 | 3 | — | — | — | — | 2.0 | Plasticizer 3 | 7.0 |
| Example 4 | 4 | — | — | Resin B-1 | 10.0 | 2.0 | Plasticizer 1 | 10.0 |
| Example 5 | 5 | — | — | Resin B-1 | 10.0 | 2.0 | Plasticizer 1 | 10.0 |

TABLE 4-2-continued

| | Toner Composition Preparation Step | | | | | | | |
|---|---|---|---|---|---|---|---|---|
| | | Resin A | | Resin B | | Polyester resin A | Plasticizer | |
| | Toner | Type | Addition amount (parts) | Type | Addition amount (parts) | Addition amount (parts) | Type | Addition amount (parts) |
| Example 6 | 6 | — | — | Resin B-1 | 10.0 | 2.0 | Plasticizer 1 | 10.0 |
| Example 7 | 7 | — | — | Resin B-1 | 10.0 | 2.0 | Plasticizer 1 | 10.0 |
| Example 8 | 8 | — | — | Resin B-1 | 10.0 | 2.0 | — | — |
| Example 9 | 9 | — | — | Resin B-2 | 10.0 | 2.0 | — | — |
| Example 10 | 10 | — | — | Resin B-3 | 10.0 | 2.0 | — | — |
| Example 11 | 11 | — | — | — | — | 2.0 | — | — |
| Example 12 | 12 | — | — | Resin B-1 | 10.0 | 2.0 | Plasticizer 1 | 18.0 |
| Example 13 | 13 | — | — | Resin B-1 | 10.0 | 2.0 | Plasticizer 1 | 18.0 |
| Example 14 | 14 | — | — | Resin B-1 | 10.0 | 2.0 | Plasticizer 1 | 10.0 |
| Example 15 | 15 | — | — | Resin B-1 | 10.0 | 2.0 | Plasticizer 1 | 10.0 |
| Example 16 | 16 | Resin A-4 | 5.0 | Resin B-1 | 10.0 | 2.0 | Plasticizer 1 | 10.0 |
| Example 17 | 17 | Resin A-4 | 5.0 | Resin B-1 | 10.0 | 2.0 | Plasticizer 1 | 10.0 |
| Example 18 | 18 | — | — | Resin B-1 | 10.0 | 2.0 | Plasticizer 1 | 10.0 |
| Example 19 | 19 | — | — | Resin B-1 | 10.0 | 2.0 | Plasticizer 1 | 10.0 |
| Example 20 | 20 | — | — | Resin B-1 | 10.0 | 2.0 | Plasticizer 1 | 10.0 |
| Example 21 | 21 | — | — | Resin B-1 | 10.0 | 2.0 | Plasticizer 1 | 10.0 |
| Example 22 | 22 | — | — | Resin B-1 | 10.0 | 2.0 | Plasticizer 1 | 10.0 |
| Example 23 | 23 | — | — | Resin B-4 | 10.0 | 2.0 | — | — |
| Example 24 | 24 | — | — | Resin B-1 | 10.0 | 2.0 | Plasticizer 1 | 10.0 |
| Example 25 | 33 | — | — | Resin B-1 | 10.0 | 2.0 | Plasticizer 1 | 10.0 |
| Comperative Example 1 | 25 | Resin A-14 | 7.0 | Resin B-1 | 10.0 | — | Plasticizer 1 | 10.0 |
| Comperative Example 2 | 26 | — | — | Resin B-1 | 10.0 | 2.0 | — | — |
| Comperative Example 3 | 27 | Resin A-10 | 5.0 | Resin B-1 | 10.0 | 2.0 | Plasticizer 1 | 10.0 |
| Comperative Example 4 | 28 | — | — | Resin B-1 | 10.0 | 2.0 | Plasticizer 1 | 10.0 |
| Comperative Example 5 | 29 | — | — | Resin B-1 | 10.0 | 2.0 | Plasticizer 1 | 10.0 |
| Comperative Example 6 | 30 | Resin A-13 | 5.0 | Resin B-1 | 10.0 | 2.0 | Plasticizer 1 | 10.0 |
| Comperative Example 7 | 31 | — | — | Resin B-1 | 10.0 | 2.0 | Plasticizer 1 | 10.0 |
| Comperative Example 8 | 32 | — | — | Resin B-1 | 10.0 | 2.0 | Plasticizer 1 | 10.0 |

Besides the materials given in Tables 4-1 and 4-2 above, in the production of each toner there were added 5.0 parts of carbon black, 5.0 parts of a hydrocarbon wax, and 0.1 part of hexanediol diacrylate in the toner composition preparation step, similarly to the case of Toner 1.

The abbreviations in Tables 4-1 and 4-2 are as follows.

Plasticizer 1: ethylene glycol distearate

Plasticizer 2: hexanediol dimyristate

Plasticizer 3: hexanediol dibehenate

TABLE 5

| | | | Polymerization Step II | | Surface Treatment Step I | | Surface Treatment Step II | | External Addition Step |
|---|---|---|---|---|---|---|---|---|---|
| | | | S1 | S2 | | | S2 | | S3 |
| | Toner | Polymerization Step | Addition amount (parts) | Addition amount (parts) | Resin A | Addition amount (parts) | Addition amount (parts) | pH | Addition amount (parts) |
| Example 1 | 1 | I to II | 0.08 | 0.12 | — | — | 4.0 | 9.5 | — |
| Example 2 | 2 | I to II | 0.08 | 0.12 | — | — | 4.0 | 9.5 | — |
| Example 3 | 3 | I to II | 0.08 | 0.12 | — | — | 4.0 | 9.5 | — |
| Example 4 | 4 | I to II | 0.08 | 0.12 | — | — | 2.0 | 9.5 | — |
| Example 5 | 5 | I to II | 0.08 | 0.12 | — | — | 6.0 | 8.5 | — |
| Example 6 | 6 | I to II | 0.08 | 0.12 | — | — | 3.0 | 9.5 | — |
| Example 7 | 7 | I to III | — | — | Resin A-1 | 5.0 | 4.0 | 9.5 | — |
| Example 8 | 8 | I to III | — | — | Resin A-1 | 5.0 | 4.0 | 9.5 | — |
| Example 9 | 9 | I to III | — | — | Resin A-1 | 5.0 | 4.0 | 9.5 | — |
| Example 10 | 10 | I to III | — | — | Resin A-1 | 5.0 | 4.0 | 9.5 | — |
| Example 11 | 11 | I to III | — | — | Resin A-2 | 5.0 | — | — | 4.0 |
| Example 12 | 12 | I to III | — | — | Resin A-2 | 5.0 | 4.0 | 9.5 | — |
| Example 13 | 13 | I to III | — | — | Resin A-2 | 5.0 | 4.0 | 9.5 | — |

TABLE 5-continued

| | | | Polymerization Step II | | Surface Treatment | | Surface Treatment Step II | | External Addition Step |
|---|---|---|---|---|---|---|---|---|---|
| | | | S1 | S2 | Step I | | S2 | | S3 |
| | Toner | Polymerization Step | Addition amount (parts) | Addition amount (parts) | Resin A | Addition amount (parts) | Addition amount (parts) | pH | Addition amount (parts) |
| Example 14 | 14 | I to III | — | — | Resin A-3 | 5.0 | 4.0 | 9.5 | — |
| Example 15 | 15 | I to II | 0.08 | 0.12 | — | — | 4.0 | 9.5 | — |
| Example 16 | 16 | I to III | — | — | — | — | 4.0 | 9.5 | — |
| Example 17 | 17 | I to III | — | — | — | — | 4.0 | 9.5 | — |
| Example 18 | 18 | I to III | — | — | Resin A-4 | 5.0 | 4.0 | 9.5 | — |
| Example 19 | 19 | I to III | — | — | Resin A-5 | 5.0 | 4.0 | 9.5 | — |
| Example 20 | 20 | I to III | — | — | Resin A-6 | 5.0 | 4.0 | 9.5 | — |
| Example 21 | 21 | I to III | — | — | Resin A-7 | 5.0 | 4.0 | 9.5 | — |
| Example 22 | 22 | I to III | — | — | Resin A-8 | 5.0 | 4.0 | 9.5 | — |
| Example 23 | 23 | I to III | — | — | Resin A-1 | 5.0 | 4.0 | 9.5 | — |
| Example 24 | 24 | I to II | 0.08 | 0.12 | — | — | 6.5 | 8.0 | — |
| Example 25 | 33 | I to II | 0.08 | 0.12 | — | — | 4.0 | 9.5 | — |
| Comperative Example 1 | 25 | I to III | — | — | — | — | — | — | 4.0 |
| Comperative Example 2 | 26 | I to III | — | — | Resin A-9 | 5.0 | 4.0 | 9.5 | — |
| Comperative Example 3 | 27 | I to III | — | — | — | — | 4.0 | 9.5 | — |
| Comperative Example 4 | 28 | I to III | — | — | Resin A-11 | 5.0 | 4.0 | 9.5 | — |
| Comperative Example 5 | 29 | I to III | — | — | Resin A-12 | 5.0 | 4.0 | 9.5 | — |
| Comperative Example 6 | 30 | I to III | — | — | — | — | 4.0 | 9.5 | — |
| Comperative Example 7 | 31 | I to II | 0.08 | 0.12 | — | — | 4.0 | 9.5 | — |
| Comperative Example 8 | 32 | I to II | 0.08 | 0.12 | — | — | 4.0 | 9.5 | — |

The abbreviations in Table 5 are as follows.

S1: 3-methacryloxypropyltrimethoxysilane

S2: methyltrimethoxysilane

S3: 40 nm sol-gel silica

TABLE 6-1

| | Toner | weight-average molecular weight Mw | THF-insoluble fraction content (mass %) | weight-average particle diameter (μm) | P(Si)/P(T) | R [nm] | H [nm] |
|---|---|---|---|---|---|---|---|
| Example 1 | 1 | 225,000 | 7 | 6.5 | 0.010 | 114 | 40 |
| Example 2 | 2 | 220,000 | 7 | 6.6 | 0.010 | 105 | 40 |
| Example 3 | 3 | 242,600 | 7 | 6.5 | 0.010 | 116 | 40 |
| Example 4 | 4 | 214,200 | 5 | 6.4 | 0.010 | 112 | 20 |
| Example 5 | 5 | 223,000 | 9 | 6.5 | 0.010 | 234 | 95 |
| Example 6 | 6 | 201,200 | 6 | 6.6 | 0.010 | 81 | 27 |
| Example 7 | 7 | 211,000 | 7 | 6.5 | 0.010 | 102 | 40 |
| Example 8 | 8 | 233,000 | 7 | 6.5 | 0.010 | 95 | 40 |
| Example 9 | 9 | 206,000 | 7 | 6.6 | 0.010 | 116 | 40 |
| Example 10 | 10 | 223,500 | 7 | 6.4 | 0.010 | 119 | 40 |
| Example 11 | 11 | 224,800 | 7 | 6.4 | 0.010 | — | — |
| Example 12 | 12 | 223,600 | 7 | 6.5 | 0.010 | 109 | 40 |
| Example 13 | 13 | 216,000 | 7 | 6.4 | 0.010 | 94 | 40 |
| Example 14 | 14 | 222,700 | 7 | 6.4 | 0.010 | 94 | 40 |
| Example 15 | 15 | 225,000 | 7 | 6.6 | 0.010 | 100 | 40 |
| Example 16 | 16 | 237,800 | 7 | 6.6 | 0.001 | 118 | 40 |
| Example 17 | 17 | 208,800 | 7 | 6.5 | 0.001 | 108 | 40 |
| Example 18 | 18 | 236,700 | 7 | 6.5 | 0.004 | 106 | 40 |
| Example 19 | 19 | 246,000 | 7 | 6.6 | 0.020 | 105 | 40 |
| Example 20 | 20 | 233,000 | 7 | 6.4 | 0.040 | 93 | 40 |
| Example 21 | 21 | 239,800 | 7 | 6.4 | 0.010 | 104 | 40 |
| Example 22 | 22 | 227,500 | 7 | 6.4 | 0.008 | 106 | 40 |
| Example 23 | 23 | 234,700 | 7 | 6.5 | 0.010 | 109 | 41 |

TABLE 6-1-continued

| | Toner | weight-average molecular weight Mw | THF-insoluble fraction content (mass %) | weight-average particle diameter (μm) | P(Si)/P(T) | R [nm] | H [nm] |
|---|---|---|---|---|---|---|---|
| Example 24 | 24 | 222,900 | 7 | 6.4 | 0.010 | 260 | 116 |
| Example 25 | 33 | 229,800 | 7 | 6.5 | 0.010 | 102 | 40 |
| Comperative Example 1 | 25 | 204,800 | 7 | 6.4 | 0.001 | — | — |
| Com perative Example 2 | 26 | 221,000 | 7 | 6.6 | 0.001 | 113 | 40 |
| Comperative Example 3 | 27 | 244,200 | 7 | 6.5 | 0.003 | 103 | 40 |
| Comperative Example 4 | 28 | 210,000 | 7 | 6.5 | 0.040 | 92 | 40 |
| Comperative Example 5 | 29 | 246,400 | 10.2 | 6.6 | 0.100 | 108 | 40 |
| Comperative Example 6 | 30 | 211,500 | 7 | 6.6 | 0.001 | 118 | 40 |
| Comperative Example 7 | 31 | 203,600 | 7 | 6.5 | 0.010 | 100 | 40 |
| Comperative Example 8 | 32 | 240,700 | 9 | 6.4 | 0.010 | 98 | 40 |

In Table 6-1, the weight-average molecular weight Mw denotes the weight-average molecular weight Mw of a tetrahydrofuran-soluble fraction of each resin.

TABLE 6-2

| | Toner | M1 Content in resin A (mass %) | M2 Content in resin A (mass %) | M3 Content in resin A (mass %) | M1 Content in resin B (mass %) | A/B | A + B | Resin A Mw | Resin B Mw | M1 Content in toner (mass %) |
|---|---|---|---|---|---|---|---|---|---|---|
| Example 1 | 1 | 72 | 0.20 | 3 | 98 | 0.3 | 82 | 194,600 | 3,000 | 60 |
| Example 2 | 2 | 72 | 0.20 | 6 | — | 0.3 | 82 | 199,300 | — | 65 |
| Example 3 | 3 | 72 | 0.20 | 6 | — | 0.3 | 82 | 201,100 | — | 70 |
| Example 4 | 4 | 72 | 0.20 | 3 | 98 | 0.3 | 82 | 200,600 | 3,000 | 65 |
| Example 5 | 5 | 72 | 0.20 | 3 | 98 | 0.3 | 82 | 198,100 | 3,000 | 65 |
| Example 6 | 6 | 72 | 0.20 | 3 | 98 | 0.3 | 82 | 191,800 | 3,000 | 65 |
| Example 7 | 7 | 72 | 0.20 | 3 | 98 | 0.3 | 82 | 74,900 | 3,000 | 4 |
| Example 8 | 8 | 72 | 0.20 | 3 | 85 | 0.3 | 82 | 74,900 | 3,000 | 4 |
| Example 9 | 9 | 72 | 0.20 | 3 | 100 | 0.3 | 82 | 74,900 | 5,000 | 4 |
| Example 10 | 10 | 72 | 0.20 | 3 | — | 0.3 | 82 | 74,900 | 2,000 | 4 |
| Example 11 | 11 | 67 | 0.20 | 0 | 98 | 0.3 | 82 | 71,700 | — | 4 |
| Example 12 | 12 | 67 | 0.20 | 0 | 98 | 0.3 | 82 | 71,700 | 3,000 | 4 |
| Example 13 | 13 | 67 | 0.20 | 0 | 98 | 0.3 | 82 | 71,700 | 3,000 | 4 |
| Example 14 | 14 | 74 | 0.20 | 5 | 98 | 0.3 | 82 | 76,500 | 3,000 | 4 |
| Example 15 | 15 | 83 | 0.20 | 10 | 98 | 0.3 | 82 | 200,500 | 3,000 | 60 |
| Example 16 | 16 | 72 | 0.05 | 3 | 98 | 0.3 | 82 | 75,000 | 3,000 | 4 |
| Example 17 | 17 | 72 | 0.05 | 3 | 98 | 0.3 | 82 | 75,000 | 3,000 | 4 |
| Example 18 | 18 | 72 | 0.05 | 3 | 98 | 0.3 | 82 | 75,000 | 3,000 | 4 |
| Example 19 | 19 | 72 | 1.00 | 3 | 98 | 0.3 | 82 | 73,700 | 3,000 | 4 |
| Example 20 | 20 | 72 | 1.90 | 3 | 98 | 2.5 | 80 | 74,500 | 3,000 | 4 |
| Example 21 | 21 | 72 | 0.39 | 3 | 98 | 1.1 | 62 | 78,300 | 3,000 | 4 |
| Example 22 | 22 | 72 | 0.10 | 3 | 98 | 1.8 | 91 | 72,200 | 3,000 | 4 |
| Example 23 | 23 | 72 | 0.20 | 3 | 75 | 0.3 | 82 | 74,900 | 3,000 | 4 |
| Example 24 | 24 | 72 | 0.20 | 3 | 98 | 0.3 | 82 | 191,800 | 3,000 | 65 |
| Example 25 | 33 | 83 | 0.30 | 15 | 98 | 0.3 | 82 | 200,500 | 3,000 | 60 |
| Comperative Example 1 | 25 | — | 2.00 | 0 | 98 | 2.5 | 92 | 192,300 | 3,000 | 6 |
| Comperative Example 2 | 26 | 60 | 0.05 | 0 | 98 | 0.3 | 82 | 123,200 | 3,000 | 4 |
| Comperative Example 3 | 27 | 83 | 0.03 | 10 | 98 | 0.4 | 75 | 127,400 | 3,000 | 4 |
| Comperative Example 4 | 28 | 83 | 2.16 | 3 | 98 | 2.5 | 90 | 120,000 | 3,000 | 4 |
| Comperative Example 5 | 29 | 72 | 1.88 | 3 | 98 | 2.8 | 92 | — | 3,000 | 4 |
| Comperative Example 6 | 30 | 72 | 0.20 | 3 | 98 | 0 | 0 | 52,500 | 3,000 | 4 |
| Comperative Example 7 | 31 | 88 | 0.30 | 10 | 98 | 0.3 | 82 | 198,000 | 3,000 | 60 |
| Comperative Example 8 | 32 | 83 | 0.30 | 10 | 98 | 0.3 | 82 | 300,000 | 3,000 | 60 |

Each toner was evaluated in accordance with the evaluation methods below.

Evaluation of Fixing

Fixing evaluation was carried out using a color laser printer (LBP9600C by Canon Inc.) modified so that the fixing unit could be removed and an unfixed image could be outputted. A fixing test of an unfixed image was performed using a fixing tester modified so that fixation temperature and process speed could be regulated. To perform the evaluation, 300 g of Toner 1 were packed into a black cartridge from which toner had been removed.

Evaluation of Low-Temperature Fixability

An unfixed image was then outputted using the above-described LBP9600C modified printer, and using color laser copier paper (by Canon Marketing Japan Inc., GF-C081, 80 g/m$^2$) as a recording medium. An unfixed image 2.0 cm long and 15.0 cm wide was formed at a distance of 1.0 cm from the upper edge, in the paper feed direction, in such a manner that the toner laid-on level was 0.40 mg/cm$^2$.

The process speed was set to 300 mm/s, the fixing line pressure was set to 27.4 kgf, in a normal-temperature, normal-humidity environment (23° C., 60% RH), and then the set temperature was gradually raised at increments of 5° C., from an initial temperature of 120° C., while at the same time the unfixed image was fixed at each respective temperature.

Low-temperature fixability was evaluated by rating a low temperature-side fixing start point of the above image. The value of an image density decrease rate was taken as an evaluation index for evaluating the low temperature-side fixing start point.

Image density was measured using an X-Rite color reflection densitometer (500 series: by X-Rite Inc.). Firstly, image density at a central portion of the fixed image was measured, and then a load of 4.9 kPa (50 g/cm$^2$) was applied to the portion where the image density was measured, and the surface of the fixed image was rubbed five times at a speed of 0.2 m/sec using with lens-cleaning paper (Dasper K-3), whereupon image density was measured again. The rate of decrease (%) of image density before and after rubbing was calculated, to yield the value of image density decrease rate. The low temperature-side fixing start point is herein the lowest temperature at which the image density decrease rate was 10.0% or lower Low-temperature fixability was evaluated in accordance with the following criteria.

Evaluation Criteria

A: Low temperature-side fixing start point of 140° C. or lower

B: Low temperature-side fixing start point from 145° C. to 155° C.

C: Low temperature-side fixing start point from 160° C. to 170° C.

D: Low temperature-side fixing start point of 175° C. or higher

Evaluation of Hot Offset Resistance

An unfixed image was then outputted using the above-described LBP9600C modified printer, and using color laser copier paper (by Canon Marketing Japan Inc., GF-C081, 80 $g/m^2$) as a recording medium. An unfixed image 2.0 cm length and 15.0 cm width was formed at a distance of 1.0 cm from the upper edge, in the paper feed direction, in such a manner that the toner laid-on level was 0.20 $mg/cm^2$.

The process speed was set to 330 mm/s, the fixing line pressure was set to 27.4 kgf, in a normal-temperature, normal-humidity environment (23° C., 60% RH), and then the set temperature was gradually raised at increments of 10° C., from an initial temperature of 190° C., while at the same time the unfixed image was fixed at each respective temperature. The fixation temperature at the point in time where hot offset occurred at the trailing edge of the evaluation paper, in the paper feed direction, at the time of running through the fixing unit was checked, and hot offset resistance was evaluated in accordance with the following evaluation criteria.

Evaluation Criteria

A: Hot offset occurrence temperature of 220° C. or higher

B: Hot offset occurrence temperature from 200° C. to less than 220° C.

C: Hot offset occurrence temperature lower than 200° C.

Evaluation of Image Glossiness

Image glossiness was evaluated using images having been fixed at 180° C. in evaluation of low-temperature fixability. Image glossiness was measured using GLOSS SENSER PG-3D (by Nippon Denshoku Ind., Co., Ltd.) at an angle of 75°.

The evaluation criteria for image glossiness are as follows.

Evaluation Criteria

A: Gloss of 50 or higher

B: Gloss from 40 to less than 50

C: Gloss from 30 to less than 40

D: Gloss lower than 30

Evaluation of Developing

Developing was evaluated by modifying an HP Color Laser jet Enterprise M653dn and by setting the process speed to 340 mm/s. Toner was removed from a cartridge the interior of which was then cleaned by air blowing, after which the cartridge was filled with 250 g of toner, and an evaluation was carried out.

Image Fogging

To evaluate image fogging there was used plain paper (HP Brochure Paper 200 g, Glossy, by HP Inc., 200 $g/m^2$), having a 5 cm×5 cm post-it note pasted in the central portion.

To evaluate image fogging, 100 prints of a horizontal line image having a print percentage of 1% were outputted using color laser copier paper (by Canon Marketing Japan Inc., 80 $g/m^2$) in a low-temperature, low-humidity environment (temperature: 15° C., humidity: 10% RH). Thereafter, one print of an all-white image was printed, in a gloss paper mode, using the plain paper with a Post-it note affixed thereonto and having been prepared for evaluation of image fogging. Thereafter, the main body was powered off and the developing machine was allowed to stand for 48 hours.

After standing for 48 hours, fresh plain paper having a Post-it note affixed thereonto was prepared, separately from the plain paper having a Post-it note used above, and one print of an all-white image was outputted, in a gloss paper mode.

The reflectance (%) of a non-image portion and of the portion hidden by the post-it note on the paper for image fogging evaluation, having been outputted in accordance with the above method, were measured using a "REFLECTOMETER MODEL TC-6DS" (by Tokyo Denshoku Co., Ltd.). A numerical value (%) obtained by subtracting the obtained reflectance (%) of the non-image portion from the reflectance (%) of the portion hidden by the Post-it was taken as the value of initial image fogging.

A similar evaluation was performed after output of 10,000 prints of a horizontal line image having a print percentage of 1%, using color laser copier paper (by Canon, Inc., 80 $g/m^2$), and image fogging after durability was evaluated.

Image fogging was evaluated in accordance with the following evaluation criteria. The smaller the numerical value, the greater the extent to which image fogging is suppressed.

Evaluation Criteria

A: Less than 0.5%

B: From 0.5% to less than 1.5%

C: From 1.5% or to less than 3.0%

D: 3.0% or higher

Evaluation of Member Contamination

Upon contamination of a charging member, as is known, uneven charging occurs on a photosensitive member, giving rise to image density non-uniformity in a halftone image. Therefore, member contamination was evaluated through an evaluation of halftone gradation stability. The evaluation was performed as follows.

A fresh conductive member was newly attached to a drum unit, and image output was performed. Using color laser copier paper (by Canon Marketing Japan Inc., 80 $g/m^2$) as the evaluation paper, there were outputted 499 prints of an image having been halftone-printed over the entire surface thereof. Thereafter, the image densities of the edges (30 mm from the left and right edges) and the central portion of the 500th sheet of evaluation paper sheet were measured, to evaluate a difference in density between the edges and the central portion.

Image density was measured using an X-Rite color reflection densitometer (500 series: by X-Rite Inc.). Herein a rating of C or better was deemed to be good.

Evaluation Criteria

A: Density difference after durability evaluation smaller than 0.04

B: Density difference after durability evaluation from 0.04 to less than 0.08

C: Density difference after durability evaluation from 0.08 to less than 0.12

D: Density difference after durability evaluation of 0.12 or larger

Evaluation of Transfer

Transferability

The evaluation was carried out using a commercially available color laser printer Satera LBP7700C (by Canon Inc.). Toner was removed from a cartridge the interior of which was then cleaned by air blowing, after which the cartridge was filled with Toner 1 (200 g). The above cartridge was attached to the printer, and the following evaluation was carried out in a low-temperature, low-humidity environment (temperature 15.0° C., humidity 10.0 RH %).

Herein 10 prints of a horizontal line pattern having a print percentage of 1% were outputted, and initial transferability was evaluated. A solid image was outputted under conditions adjusted so that the toner laid-on level on the photosensitive member was 0.50 $mg/cm^2$ and untransferred toner on the photosensitive member at the time of formation of a solid image was taped off using Mylar tape. A reflectance difference worked out by subtracting a reflectance TO of the tape alone affixed to paper from a reflectance T1 of the stripped tape having been affixed on the evaluation paper (Canon Marketing Japan, GF-C081, 80 g/cm$^2$) was then calculated.

A durability test was carried out through printing of 15,000 prints of a horizontal line pattern having a print percentage of 1%, whereupon transferability after durability was evaluated in accordance with the same method.

Reflectance was measured using REFLECTMETER MODEL TC-6DS (by Tokyo Denshoku Co., Ltd.). Transferability was evaluated according to the following criteria.

Evaluation Criteria

A: Reflectance difference of 3.0% or less

B: Reflectance difference in excess of 3.0% up to 6.0%

C: Reflectance difference in excess of 6.0% up to 10.0%

D: Reflectance difference in excess of 10.0%

In Examples 1 to 25 the above evaluation was carried out using Toners 1 to 24 and 33. In Comparative examples 1 to 9, the above evaluation was performed using Toners 25 to 32. Tables 7-1 and 7-2 sets out the toner evaluation results. As shown in Tables 7-1 and 7-2, the toner of Example 1 exhibited good results in all evaluations.

TABLE 7-1

| | | Low-Temperature Fixability | | Hot Offset Resistance | | Image Glossiness | |
|---|---|---|---|---|---|---|---|
| | Toner | Low temperature-side fixing start point (° C.) | Evaluation | Occurrence temperature (° C.) | Evaluation | Gloss | Evaluation |
| Example 1 | 1 | 130 | A | 220 | A | 60 | A |
| Example 2 | 2 | 145 | B | 220 | A | 55 | A |
| Example 3 | 3 | 150 | B | 220 | A | 56 | A |
| Example 4 | 4 | 140 | A | 220 | A | 65 | A |
| Example 5 | 5 | 135 | A | 220 | A | 60 | A |
| Example 6 | 6 | 135 | A | 220 | A | 64 | A |
| Example 7 | 7 | 130 | A | 220 | A | 60 | A |
| Example 8 | 8 | 150 | B | 220 | A | 57 | A |
| Example 9 | 9 | 155 | B | 220 | A | 58 | A |
| Example 10 | 10 | 145 | B | 220 | A | 56 | A |
| Example 11 | 11 | 170 | C | 220 | A | 36 | C |
| Example 12 | 12 | 155 | B | 220 | A | 54 | A |
| Example 13 | 13 | 155 | B | 220 | A | 53 | A |
| Example 14 | 14 | 140 | A | 220 | A | 54 | A |
| Example 15 | 15 | 145 | B | 220 | A | 60 | A |
| Example 16 | 16 | 140 | A | 220 | A | 57 | A |
| Example 17 | 17 | 140 | A | 220 | A | 56 | A |
| Example 18 | 18 | 135 | A | 210 | B | 55 | A |
| Example 19 | 19 | 135 | A | 220 | A | 55 | A |
| Example 20 | 20 | 135 | A | 200 | B | 53 | A |
| Example 21 | 21 | 135 | A | 220 | A | 61 | A |
| Example 22 | 22 | 135 | A | 220 | A | 63 | A |
| Example 23 | 23 | 155 | B | 220 | A | 44 | B |
| Example 24 | 24 | 165 | C | 220 | A | 55 | A |
| Example 25 | 33 | 140 | A | 200 | B | 38 | C |
| Comperative Example 1 | 25 | 180 | D | 210 | B | 26 | D |
| Comperative Example 2 | 26 | 175 | D | 200 | B | 20 | D |
| Comperative Example 3 | 27 | 155 | B | 180 | C | 27 | D |
| Comperative Example 4 | 28 | 140 | A | 190 | C | 29 | D |
| Comperative Example 5 | 29 | 170 | C | 220 | A | 21 | D |
| Comperative Example 6 | 30 | 180 | D | 220 | A | 24 | D |
| Comperative Example 7 | 31 | 185 | D | 210 | B | 40 | B |
| Comperative Example 8 | 32 | 185 | D | 220 | A | 27 | D |

TABLE 7-2

| | | Image Fogging | | | | Member | | Transferability | | | |
|---|---|---|---|---|---|---|---|---|---|---|---|
| | | Initial | | after durability | | Contamination | | Initial | | after durability | |
| | | Reflectance | | Reflectance | | | | Reflectance | | Reflectance | |
| | Toner | difference (%) | Evaluation | difference (%) | Evaluation | Density difference | Evaluation | difference (%) | Evaluation | difference (%) | Evaluation |
| Example 1 | 1 | 0.1 | A | 1.5 | C | 0.02 | A | 1.4 | A | 4.5 | B |
| Example 2 | 2 | 0.4 | A | 1.4 | B | 0.02 | A | 1.6 | A | 4.7 | B |
| Example 3 | 3 | 0.2 | A | 1.1 | B | 0.03 | A | 1.5 | A | 4.5 | B |
| Example 4 | 4 | 0.2 | A | 1.0 | B | 0.01 | A | 5.7 | B | 8.5 | C |
| Example 5 | 5 | 0.3 | A | 2.6 | C | 0.09 | C | 1.0 | A | 2.5 | A |
| Example 6 | 6 | 0.3 | A | 0.6 | B | 0.02 | A | 4.6 | B | 8.0 | C |
| Example 7 | 7 | 0.3 | A | 1.2 | B | 0.02 | A | 1.4 | A | 4.5 | B |
| Example 8 | 8 | 0.3 | A | 0.7 | B | 0.03 | A | 2.1 | A | 4.8 | B |
| Example 9 | 9 | 0.2 | A | 1.5 | C | 0.03 | A | 2.1 | A | 4.9 | B |
| Example 10 | 10 | 0.4 | A | 1.2 | B | 0.03 | A | 1.9 | A | 4.8 | B |
| Example 11 | 11 | 0.2 | A | 2.0 | C | 0.10 | C | 1.7 | A | 9.6 | C |
| Example 12 | 12 | 0.4 | A | 1.3 | B | 0.03 | A | 2.0 | A | 5.0 | B |
| Example 13 | 13 | 0.1 | A | 0.7 | B | 0.02 | A | 2.0 | A | 5.0 | B |
| Example 14 | 14 | 0.3 | A | 1.3 | B | 0.02 | A | 1.9 | A | 4.7 | B |
| Example 15 | 15 | 0.4 | A | 1.4 | B | 0.02 | A | 1.8 | A | 4.6 | B |
| Example 16 | 16 | 0.6 | B | 1.3 | B | 0.06 | B | 5.2 | B | 8.5 | C |
| Example 17 | 17 | 1.4 | B | 1.0 | B | 0.07 | B | 4.7 | B | 8.6 | C |
| Example 18 | 18 | 0.2 | A | 0.6 | B | 0.04 | B | 2.8 | A | 5.8 | B |
| Example 19 | 19 | 0.3 | A | 0.7 | B | 0.03 | A | 1.9 | A | 4.4 | B |
| Example 20 | 20 | 0.3 | A | 0.9 | B | 0.02 | A | 1.1 | A | 4.0 | B |
| Example 21 | 21 | 0.3 | A | 1.4 | B | 0.02 | A | 2.0 | A | 4.8 | B |
| Example 22 | 22 | 0.2 | A | 1.4 | B | 0.03 | A | 2.3 | A | 5.1 | B |
| Example 23 | 23 | 0.6 | B | 1.4 | B | 0.03 | A | 2.2 | A | 5.1 | B |
| Example 24 | 24 | 1.1 | B | 2.9 | C | 0.10 | C | 1.0 | A | 6.0 | B |
| Example 25 | 33 | 0.6 | B | 1.4 | B | 0.03 | A | 1.8 | A | 4.6 | B |
| Comperative Example 1 | 25 | 1.1 | B | 3.4 | D | 0.13 | D | 6.8 | C | 10.5 | D |
| Comperative Example 2 | 26 | 0.8 | B | 2.1 | C | 0.05 | B | 5.5 | B | 8.4 | C |
| Comperative Example 3 | 27 | 1.4 | B | 3.0 | D | 0.07 | B | 4.9 | B | 8.1 | C |
| Comperative Example 4 | 28 | 0.3 | A | 0.6 | B | 0.03 | A | 1.8 | A | 4.0 | B |
| Comperative Example 5 | 29 | 1.1 | B | 3.0 | D | 0.03 | A | 1.3 | A | 3.9 | B |
| Comperative Example 6 | 30 | 0.7 | B | 1.9 | C | 0.07 | B | 2.4 | A | 8.4 | C |
| Comperative Example 7 | 31 | 0.6 | B | 1.4 | B | 0.03 | A | 1.7 | A | 4.5 | B |
| Comperative Example 8 | 32 | 0.7 | B | 1.3 | B | 0.02 | A | 1.8 | A | 4.5 | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113833, filed Jul. 15, 2022, which is hereby incorporated by reference herein in its entirety.

What is claimed is:

1. A toner, comprising:

a toner particle comprising a toner core particle;

the toner core particle comprising a binder resin and having a protruded portion on a surface of the toner core particle;

the binder resin comprising a styrene-acrylic copolymer resin A;

resin A comprising a monomer unit M1 represented by formula (1) and a monomer unit M2 represented by formula (2)

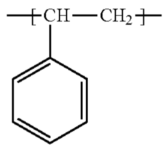

(1)

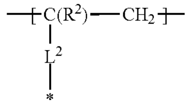

(2)

where $L^2$ is a single bond, —COO—$(CH_2)_n$— or —NH—$(CH_2)_n$—, n is an integer from 1 to 10, $R^2$ is a hydrogen atom or a methyl group, and * represents a site of bonding to a silicon atom of the organosilicon polymer segment, with the provisos that when $L^2$ is —COO—$(CH_2)_n$— a carbonyl is bonded to a carbon bonding $R^2$, and when $L^2$ is —NH—$(CH_2)_n$—NH is bonded to a carbon bonding $R^2$;

resin A comprising 65 to 85 mass % of monomer unit M1 and 0.05 to 2.00 mass % of monomer unit M2;

monomer unit M2 comprising an organosilicon polymer segment having T3 and T2 unit structures; and the protruded portion being formed of an organosilicon polymer having a structure represented by R—$SiO_{3/2}$ where R represents an alkyl group, an alkenyl group, an acyl group, an aryl group or a methacryloxyalkyl group, wherein in a DD/MAS measurement of the resin A by solid-state $^{29}$Si-NMR, $0.3 \leq A/B \leq 2.7$ and $62 \leq A+B \leq 100$ when A (%) is a ratio of a peak area corresponding to a silicon atom with the T3 unit structure relative to a total of peak areas corresponding to silicon atoms in the organosilicon polymer segment and B (%) is a ratio of a peak area corresponding to a silicon atom with the T2 unit structure relative to the total of peak areas corresponding to silicon atoms in the organosilicon polymer segment, a weight-average molecular weight Mw of a tetrahydrofuran-soluble fraction of resin A measured by gel permeation chromatography is 50000 to 250000, and in an observation of the surface of the toner particle using a scanning probe microscope, R is 80 to 250 nm and H is 25 to 100 nm when R is a number-average diameter of a maximum diameter of the protruded portion and H is a number-average height of the protruded portion.

2. The toner according to claim 1, wherein the organosilicon polymer is a polymer of an organosilicon compound having a structure represented by R—Si—$R^a_3$ where $R^a$ independently represents a halogen atom or an alkoxy group with 1 to 3 carbon atoms, and R represents an alkyl group with 1 to 6 carbon atoms.

3. The toner according to claim 1, wherein $0.004 \leq P(Si)/P(T) \leq 0.040$ when P(Si) is a peak intensity of Si and P(T) is a total peak intensity of all ions in the toner core particle, obtained by time-of-flight secondary ion mass spectrometry of the toner core particle.

4. The toner according to claim 1, wherein the toner comprises resin A in a content of 50 mass % or higher.

5. The toner according to claim 1, wherein resin A comprises a monomer unit M3 represented by formula (8) in a content of 3 to 10 mass %

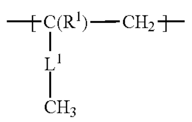

(8)

where $L^1$ represents —COO—$(CH_2)_m$—, m is an integer from 11 to 31 and $R^1$ represents a hydrogen atom or a methyl group, with the proviso that a carbonyl of $L^1$ is bonded to a carbon atom of a main chain.

6. The toner according to claim 1, wherein the toner particle comprises a plasticizer, the plasticizer comprising an ester compound of a diol with 2 to 6 carbon atoms and an aliphatic monocarboxylic acid with 14 to 22 carbon atoms.

7. The toner according to claim 1, wherein the toner particle comprises a resin B, and a weight-average molecular weight Mw of a tetrahydrofuran-soluble fraction of resin B measured by gel permeation chromatography is 2000 to 7000.

8. The toner according to claim 7, wherein resin B comprises 85 to 100 mass % of monomer unit M1.

9. The toner according to claim 1, wherein a content of a tetrahydrofuran-insoluble fraction of the toner is 0 to 10 mass %.

10. The toner according to claim 5, wherein m is an integer from 11 to 13.

* * * * *